United States Patent [19]

Sugiyama et al.

[11] Patent Number: 5,249,037
[45] Date of Patent: Sep. 28, 1993

[54] IMAGE SIGNAL CORRECTION CIRCUIT AND IMAGE SIGNAL PROCESSOR USING THE CIRCUIT

[75] Inventors: Masato Sugiyama; Isao Nakagawa; Shigeru Hirahata; Toshinori Murata; Ikuya Arai; Kazuhiro Kaizaki, all of Yokohama; Tadashi Kasezawa; Noriyuki Yamaguchi, both of Kyoto; Takuzi Kurashita, Osaka; Masaharu Yao, Kyoto, all of Japan

[73] Assignees: Hitachi, Ltd.; Mitsubishi Electric Corporation, both of Tokyo, Japan

[21] Appl. No.: 360,227

[22] Filed: Jun. 1, 1989

[30] Foreign Application Priority Data

Jun. 3, 1988 [JP] Japan ............... 63-135527

[51] Int. Cl.⁵ ............... H04N 11/20; H04N 7/01
[52] U.S. Cl. ............... 358/11; 358/31
[58] Field of Search ............... 358/11, 140, 31, 105

[56] References Cited

U.S. PATENT DOCUMENTS 4,860,090  8/1989  Murata et al. ............... 358/31
4,985,757  1/1991  Yasuki et al. ............... 358/11

FOREIGN PATENT DOCUMENTS 0140828  11/1979  Japan ............... 358/31
0040772  3/1984  Japan.
0090987  4/1988  Japan.
0276994  11/1988  Japan.

Primary Examiner—James J. Groody
Assistant Examiner—David E. Harvey
Attorney, Agent, or Firm—Antonelli, Terry, Stout & Kraus

[57] ABSTRACT

In a motion-adaptive television signal processor, a field as a reference for a moving picture signal includes a signal delayed by a frame memory or a field memory. A non-standard signal is beforehand processed so as to separate Y and C signals, and the signal thus processed is input to a motion-adaptive processor to thereby reduce a deviation in center of gravity between a still picture signal and a moving picture signal on the timebase to thereby suppress unnatural motion of the picture.

22 Claims, 22 Drawing Sheets

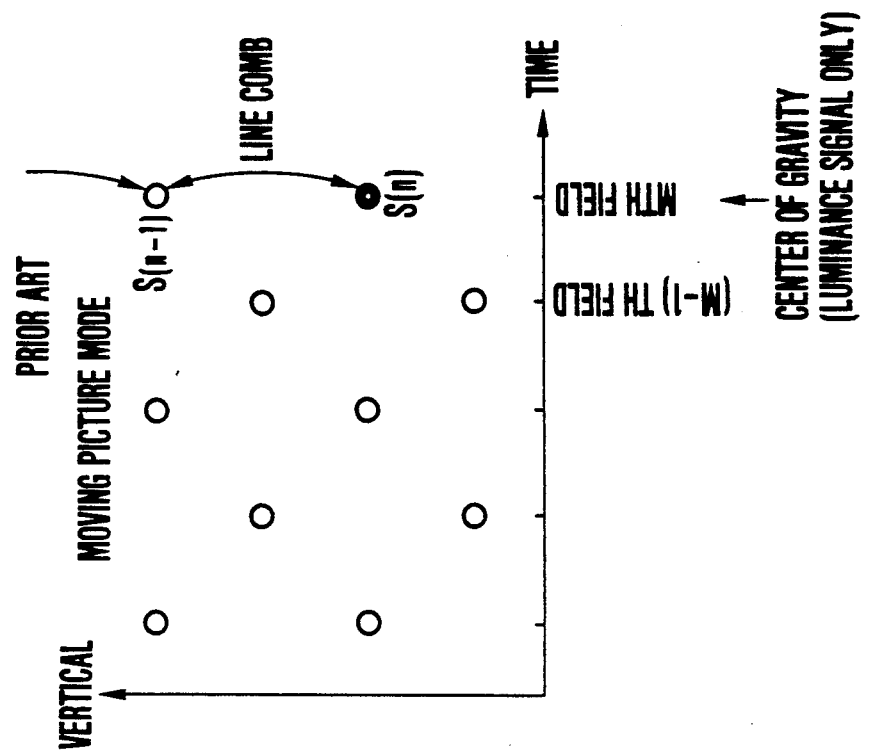
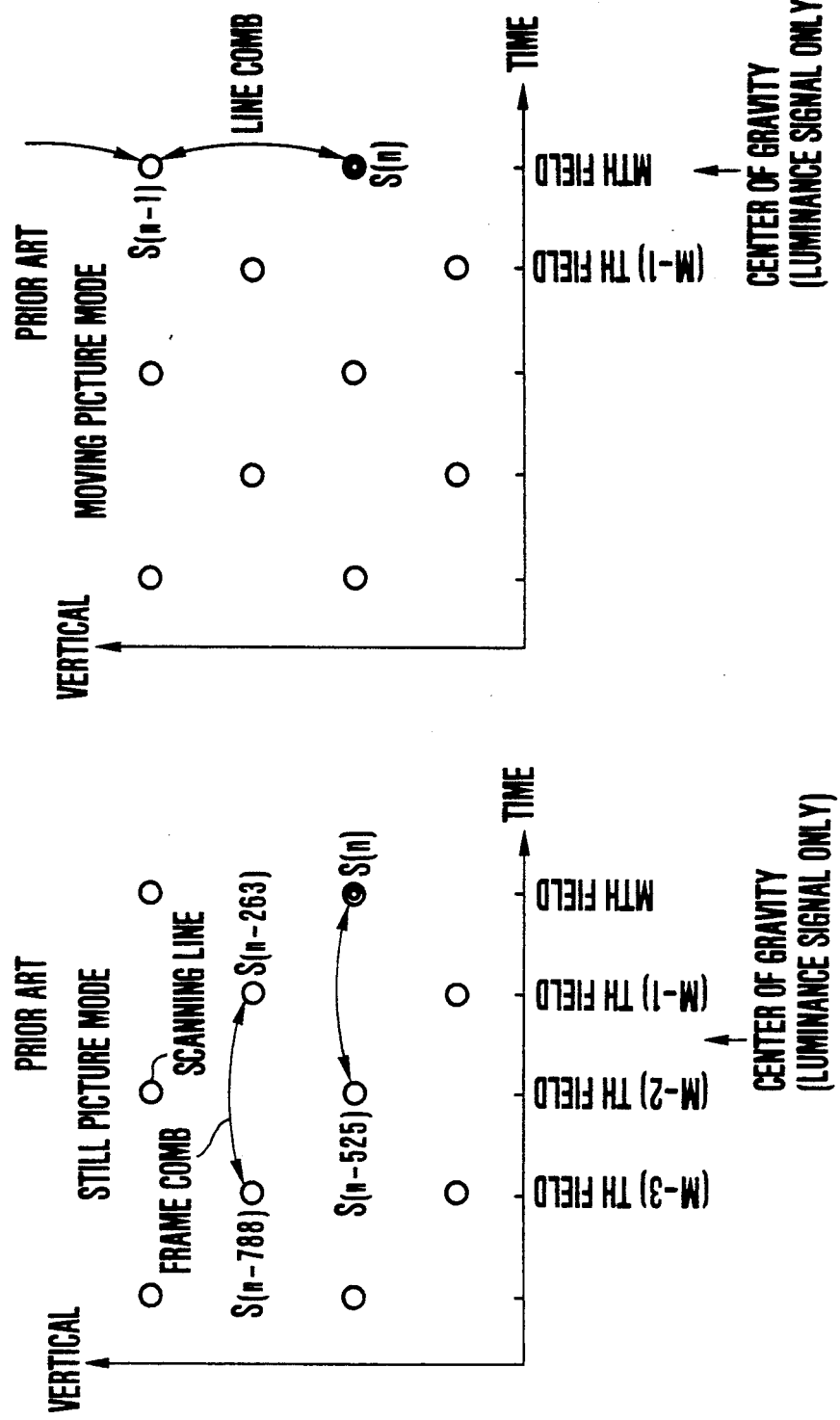

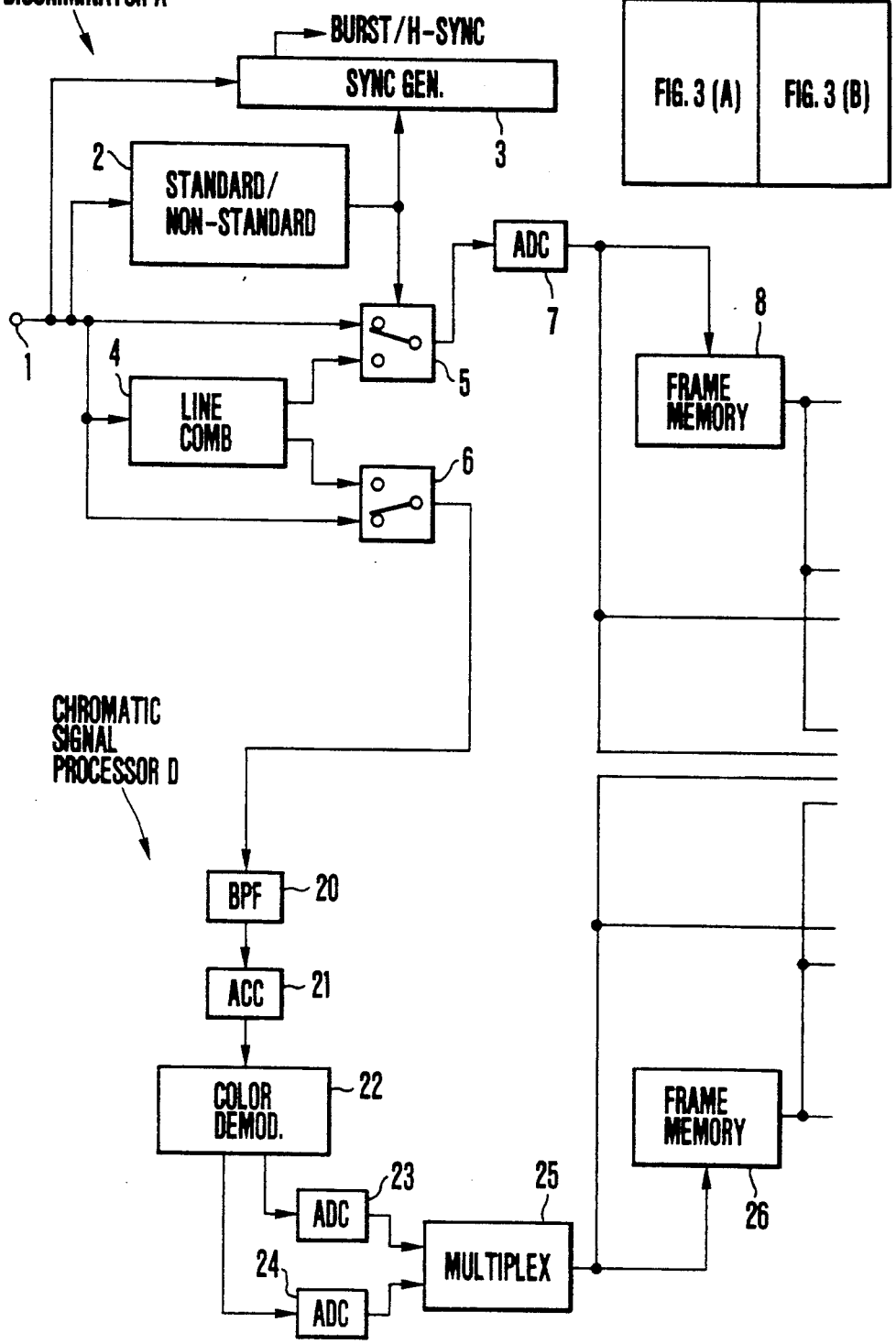

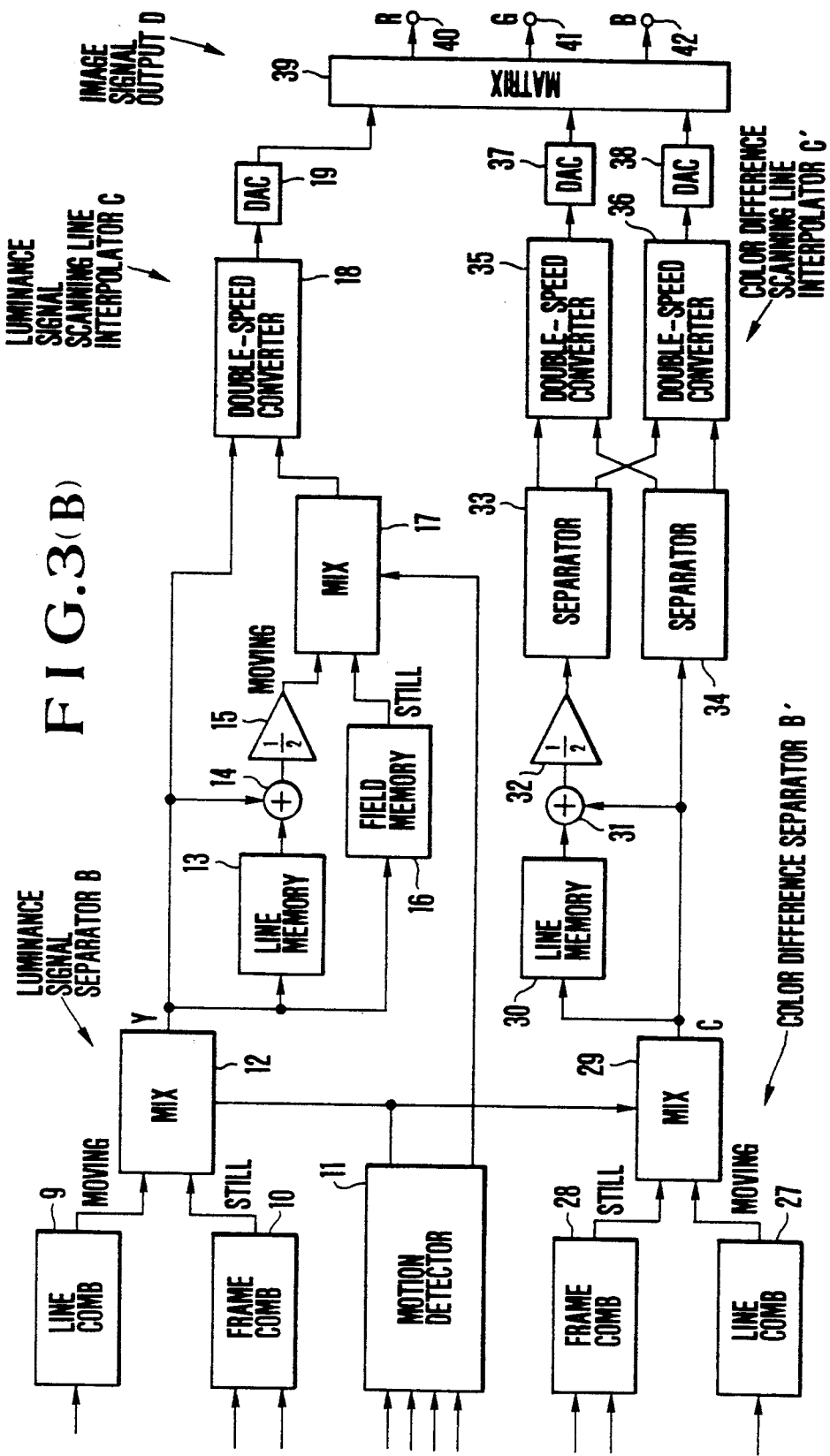

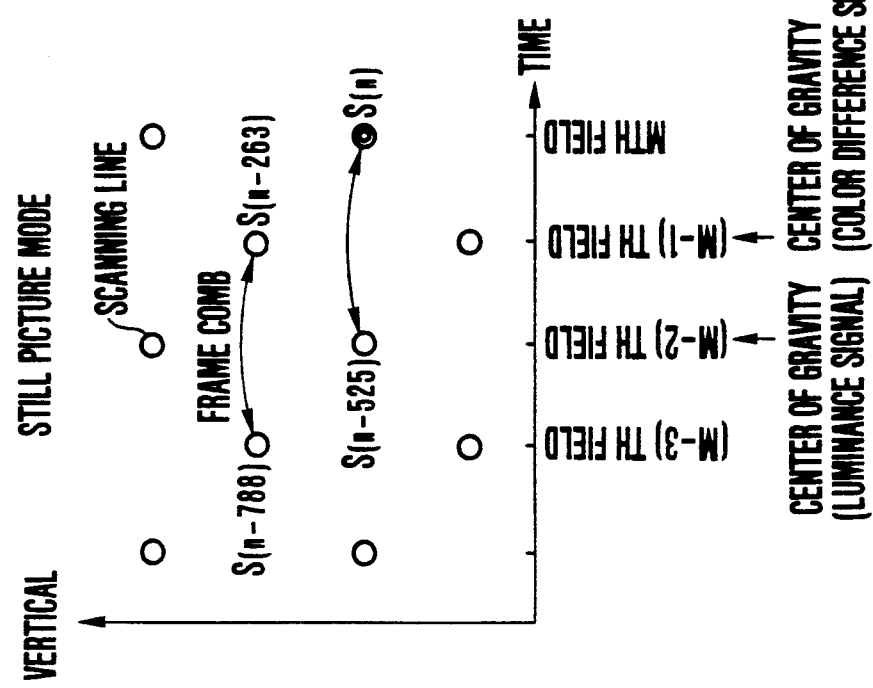
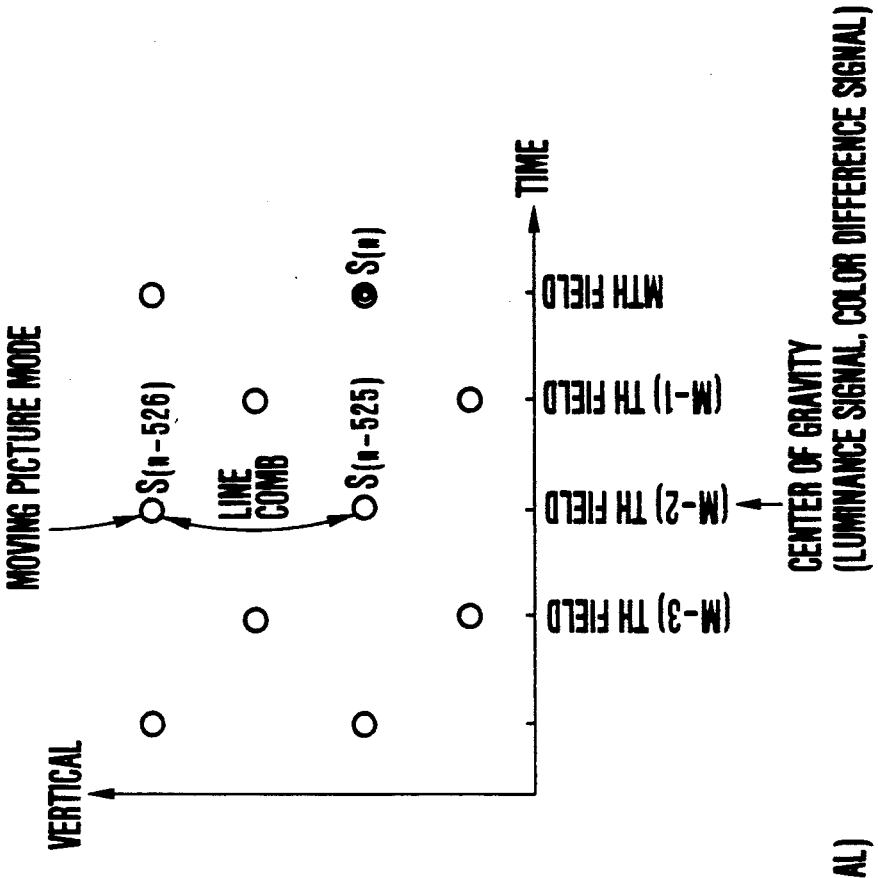

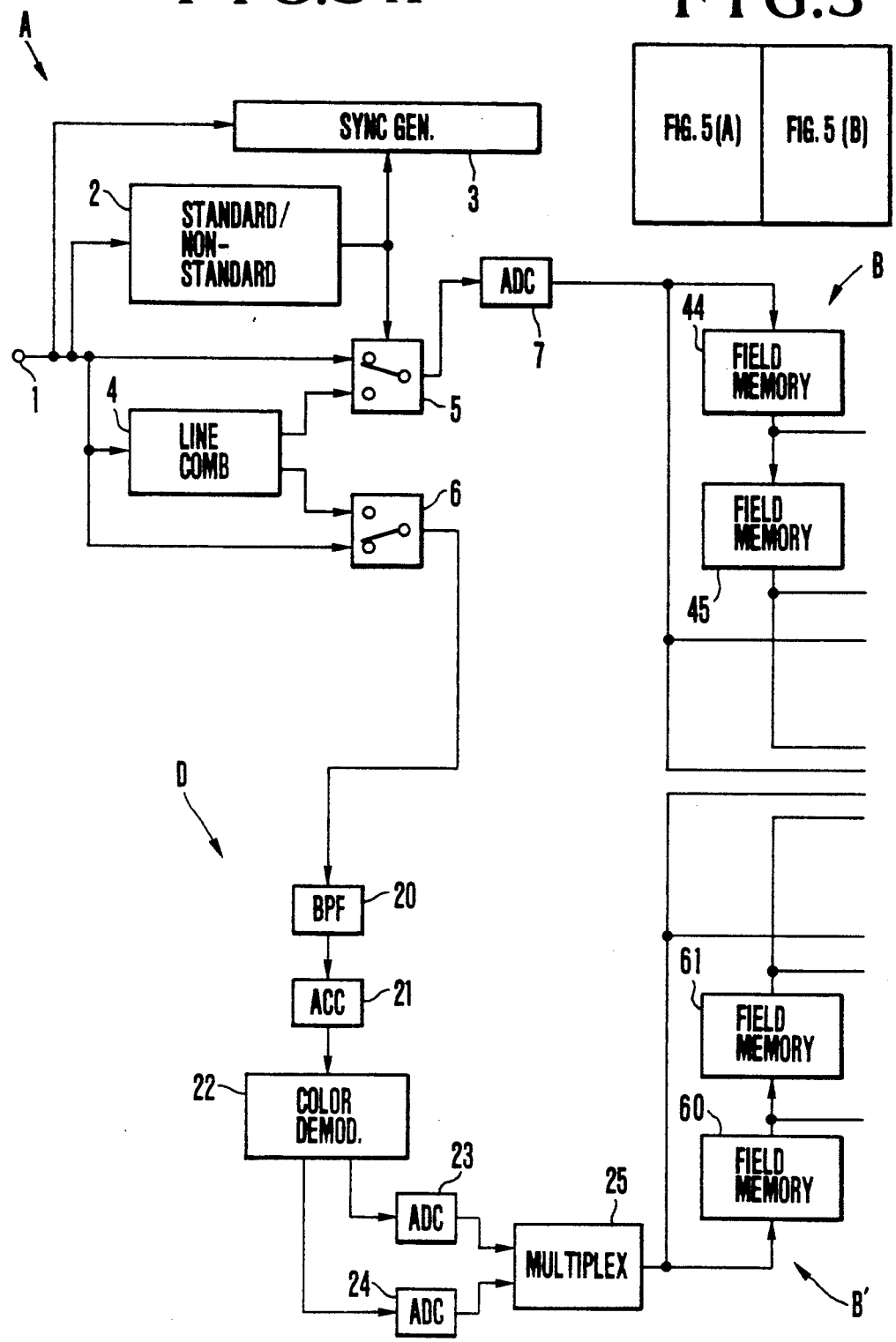

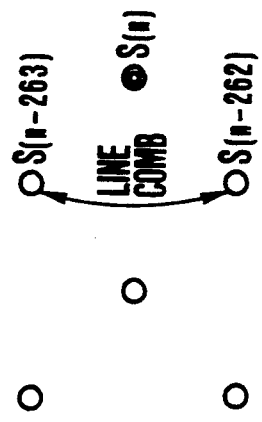
FIG.7B MOVING PICTURE MODE
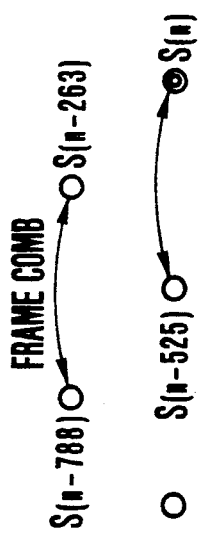
FIG.7A STILL PICTURE MODE

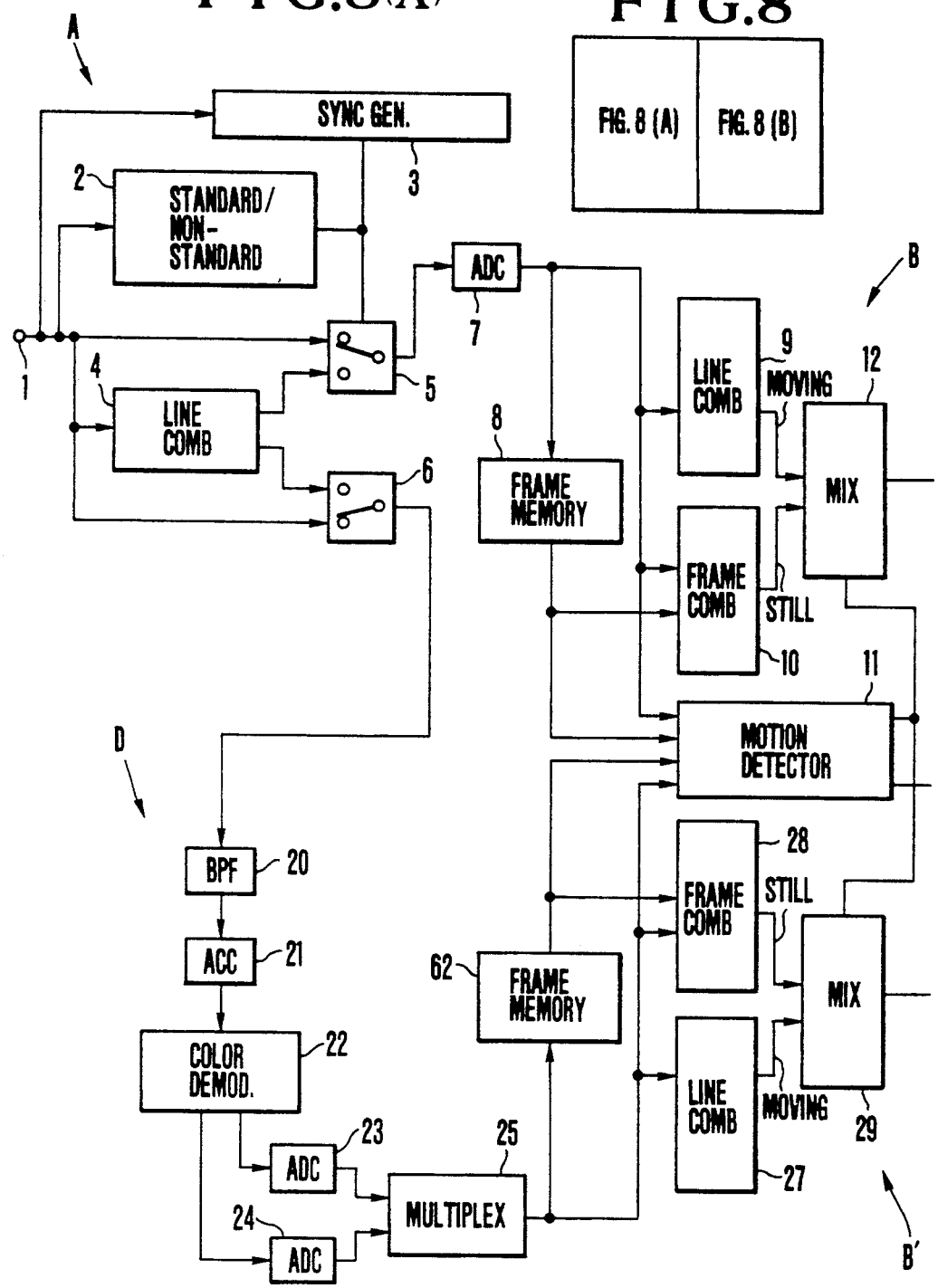

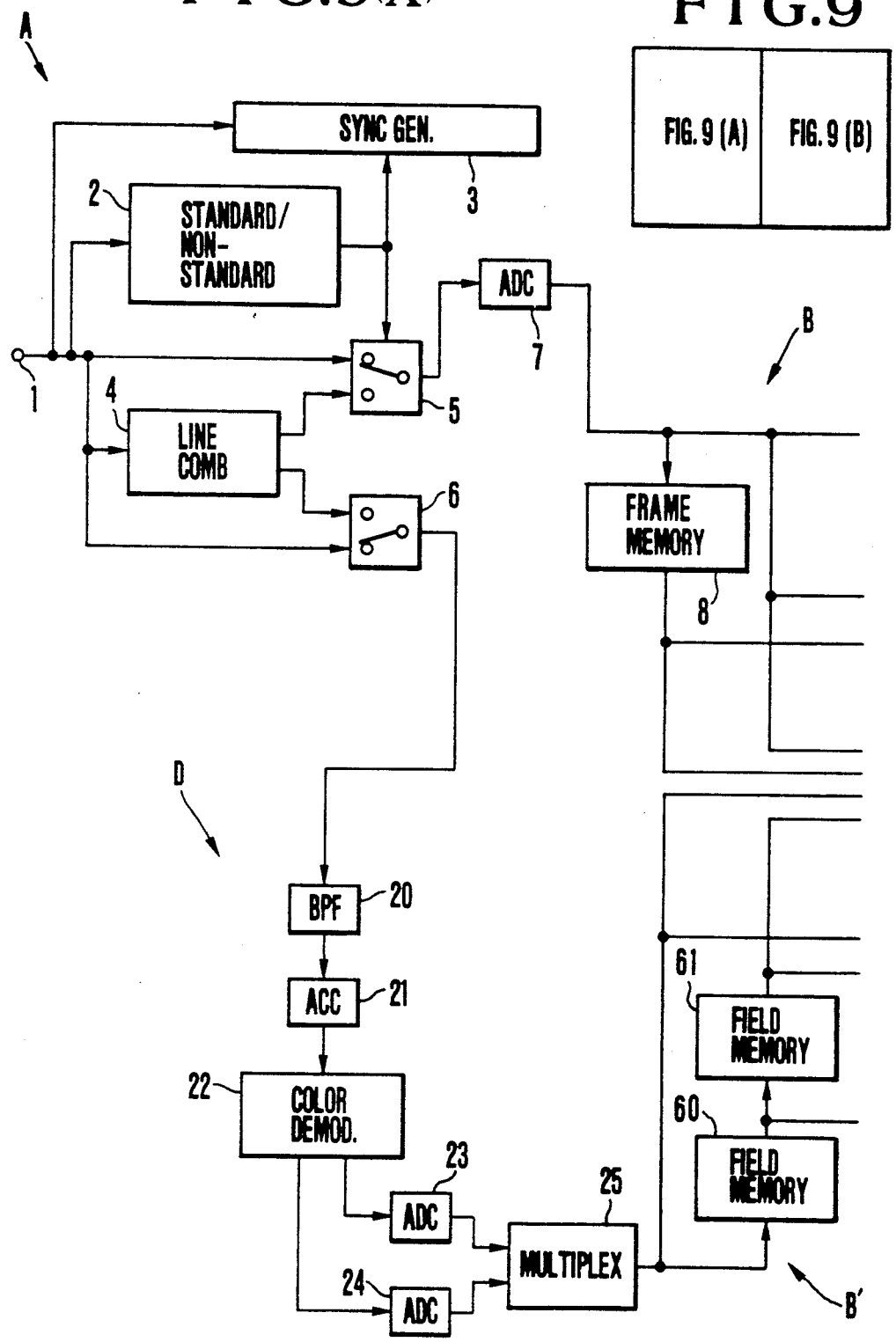

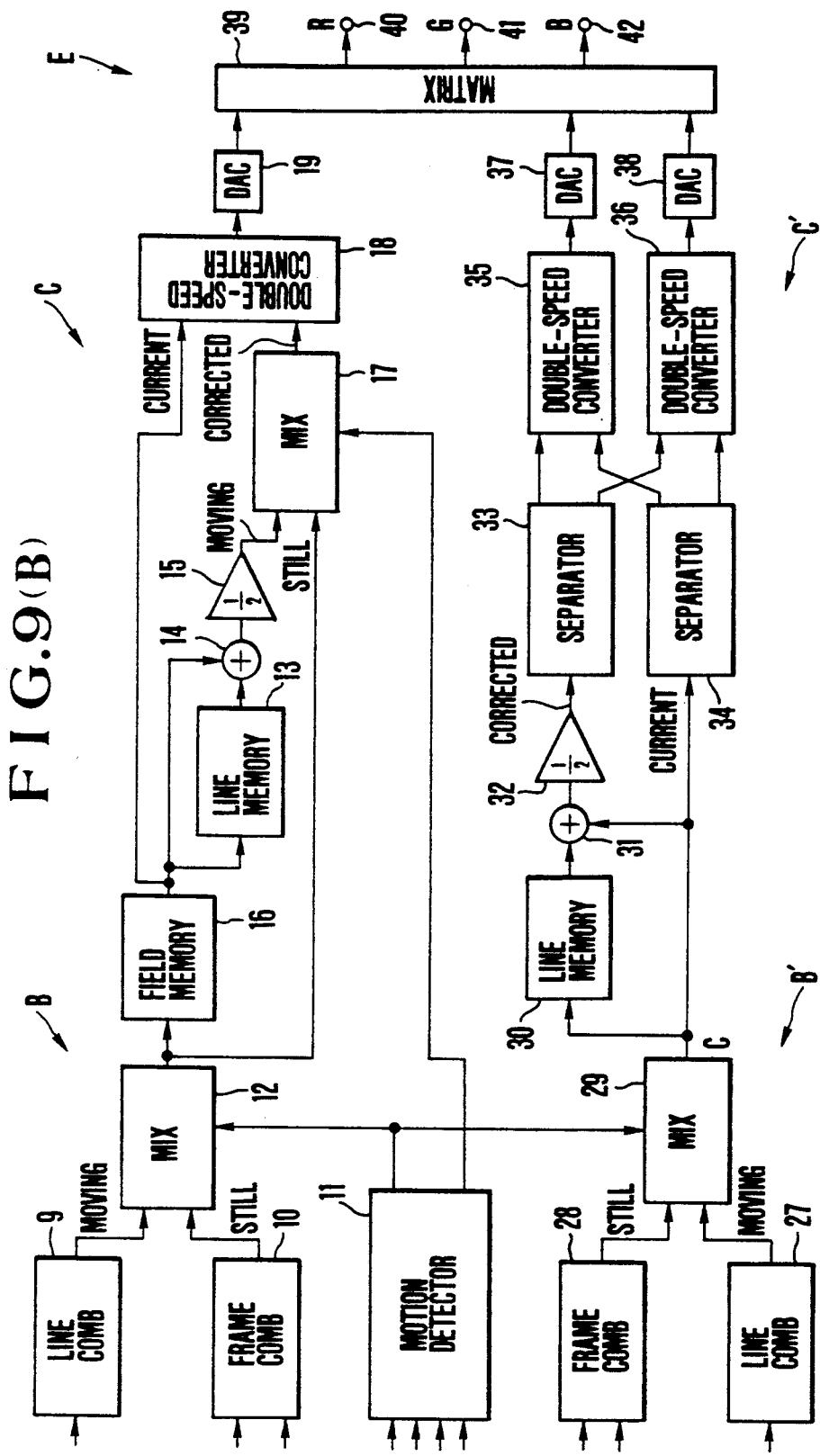

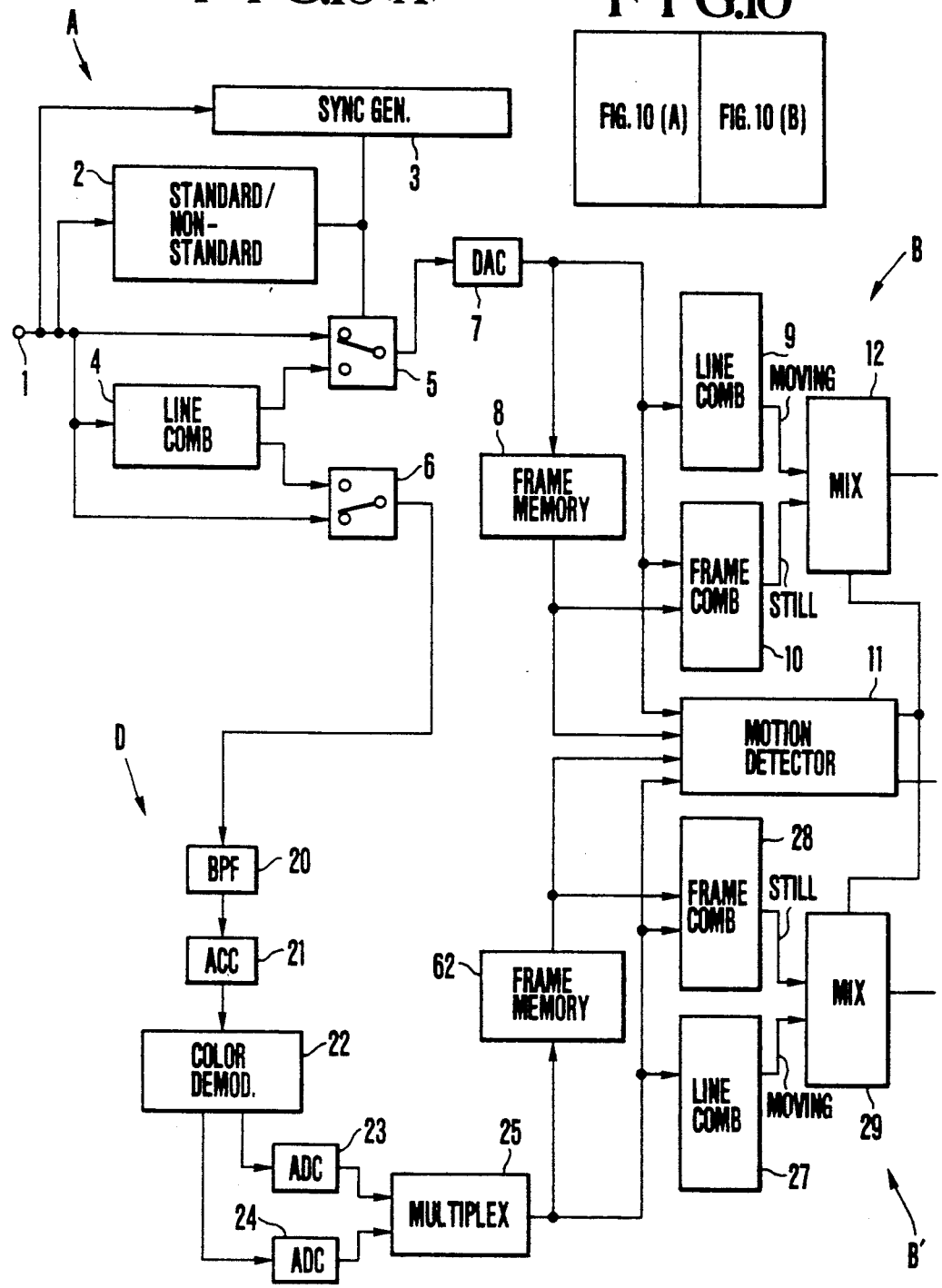

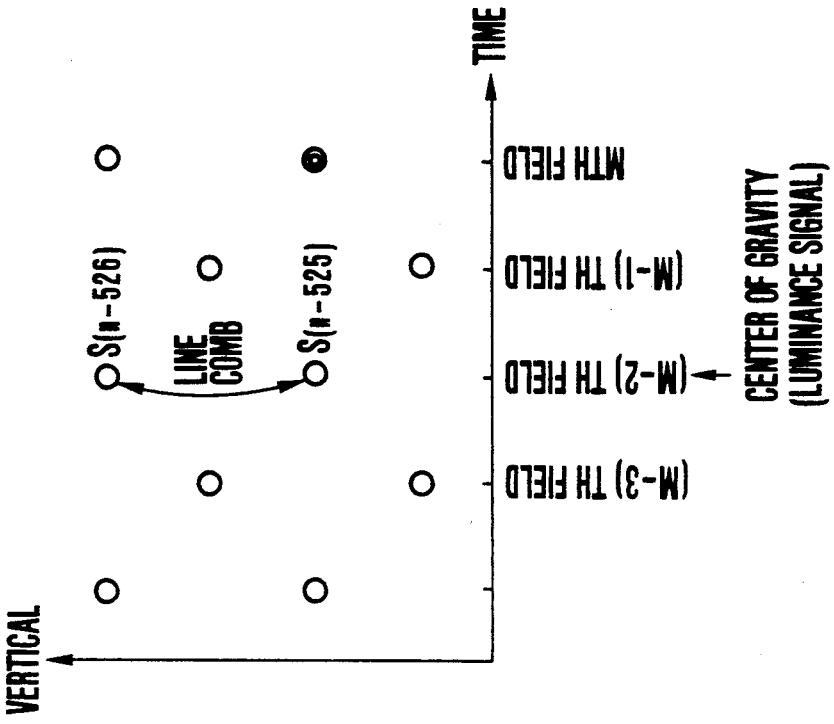
FIG.11B MOVING PICTURE MODE
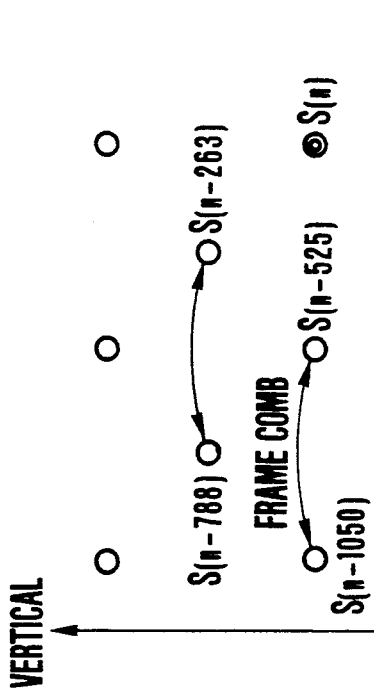
FIG.11A STILL PICTURE MODE

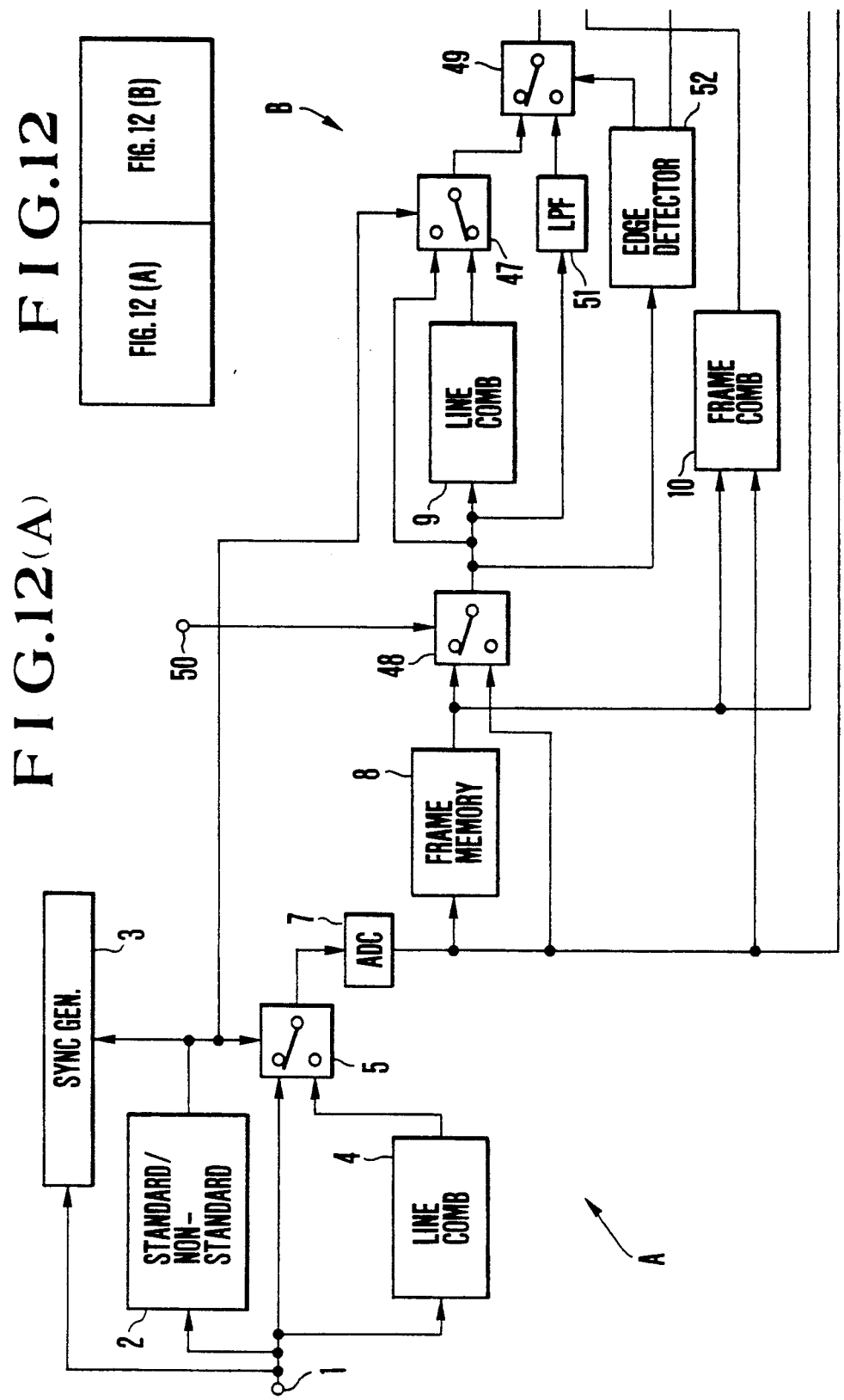

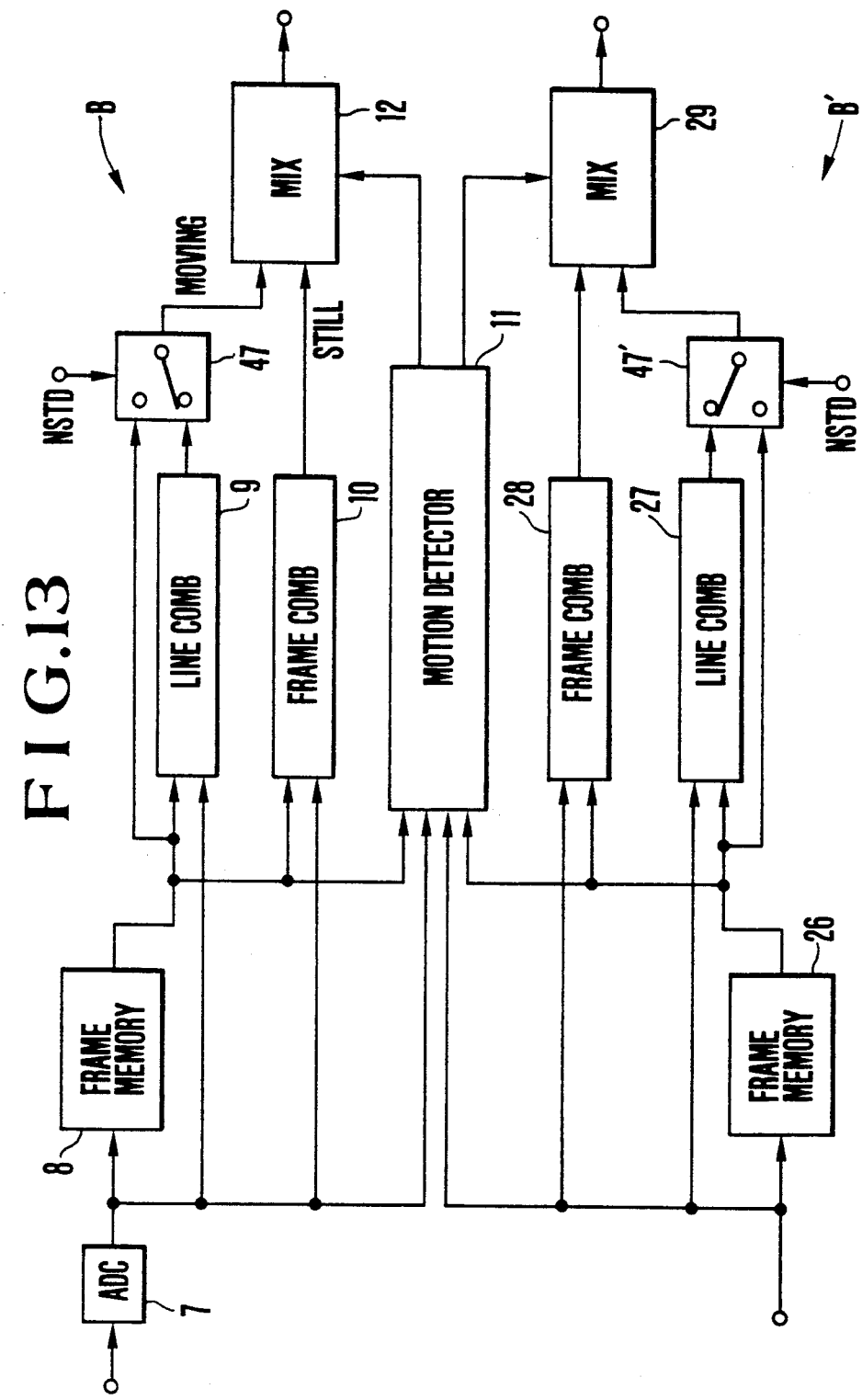

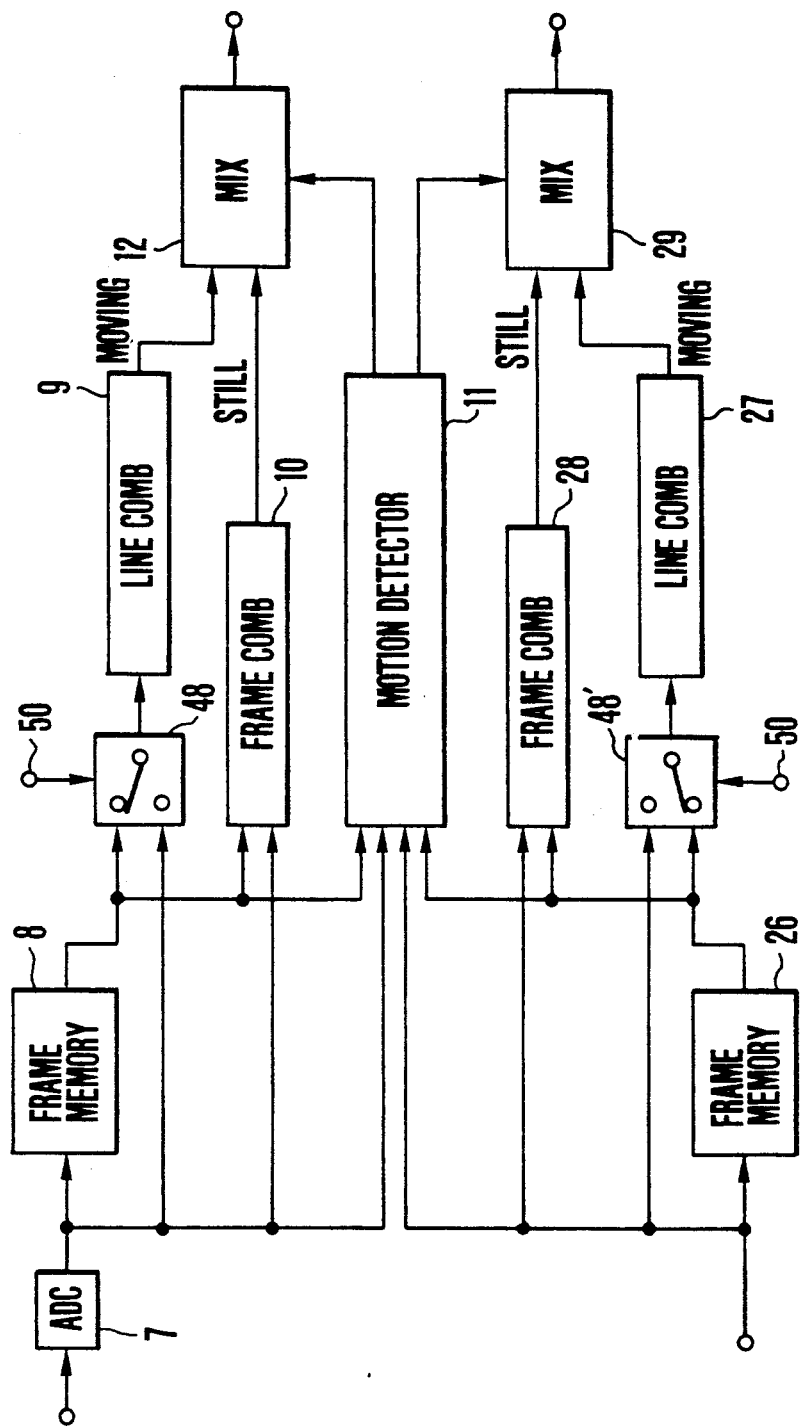

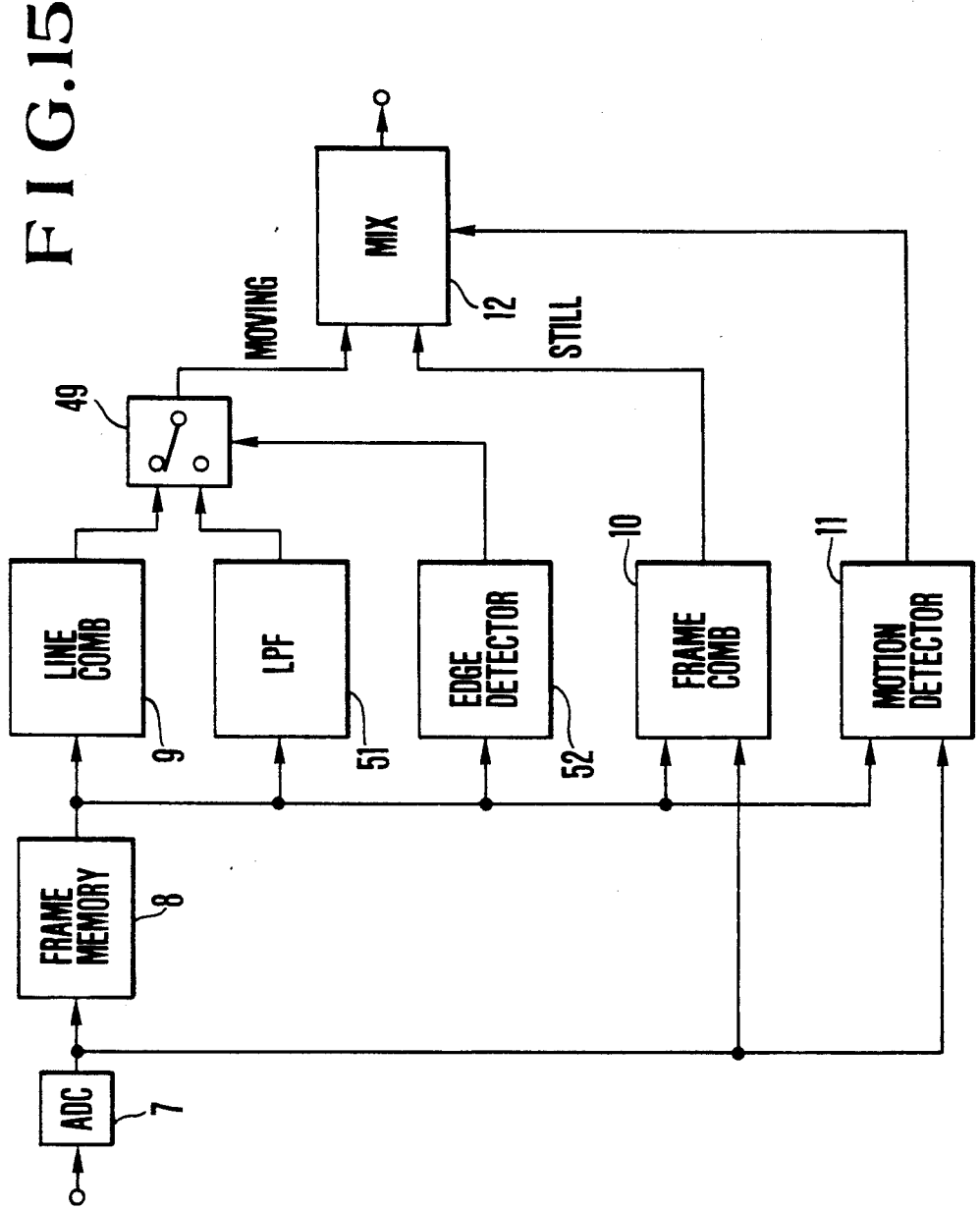

IMAGE SIGNAL CORRECTION CIRCUIT AND IMAGE SIGNAL PROCESSOR USING THE CIRCUIT

BACKGROUND OF THE INVENTION

The present invention relates to, a circuit for processing image signals such as television signals, and more particularly to image signal correction circuit including a field memory or a frame memory. The circuit further having a motion-adaptive Y and C signal separation function and a scanning line interpolation function having a delay time equal to or longer than a vertical scanning period of a television signal, and an image signal processor which receives as an image signal a standard signal conforming to an NTSC system and a non-standard signal not completely conforming to the NTSC system to thereby process these signals for high image quality.

In an NTSC system using a composite color television signal as an example, the color subcarrier is modulated with color difference signals and the resulting signal is multiplexed in a 2.1–4.2 MHz band portion of a 4.2-MHz video signal band in order to transmit the color difference signals. The color subcarrier frequency $f_{sc}$ and a horizontal scanning frequency fh have the following relationship $$f_{sc} = 455/2 f_h.$$

The horizontal scanning frequency $f_h$ and the vertical scanning frequency fv have the following relationship $$f_h = 525/2 f_v.$$

Therefore, the phases of the color subcarrier spaced by one frame period are reverse to each other. For a still picture, it is possible to separate a luminance signal and a chrominance signal using the sum of adjacent frames and the difference between the frames, respectively. Thus cross components such as cross color or cross luminance (hanging dots) can be virtually eliminated to thereby result in a high quality image.

However, if such interframe processing is performed on a moving picture, a double image would result, and cross components would be removed insufficiently to thereby cause hanging dots and hence the deterioration of the image quality.

Motion-adaptive processing would be conceivable in which the motion of an image is detected from the difference between signals spaced by one frame period, interframe processing is performed to separate the luminance signal and the chrominance signal by regarding the image as being still if the detected motion of the image is small while intrafield processing is performed by regarding the image as moving to thereby separate the luminance signal and the chrominance signal if the motion of the image is large.

There is a technique in which for an interlace scan performed in the NTSC system, scanning lines are interpolated, scan signals are converted to a non-interlace (progressive) scan and displayed on the television receiver side. If an interpolation scanning line signal is prepared using scanning line signals, one field before, output from a field memory, converted to a progressive scan signal and displayed, a line flicker generated at an edge of a horizontal line can be eliminated. Although the field interpolation greatly benefits a still image, it also greatly deteriorates a moving picture to thereby result in an undesirable comb tooth-like double image.

Japanese Patent Publication JP-A-59-40772 discloses motion-adaptive processing in which the motion of a picture is detected in accordance with an interframe difference signal, an intrafield interpolation is performed if the motion of the picture is small while an interpolated scanning line signal is prepared using a scanning line signal in a transmitted field if the motion of the image is large.

FIG. 1 shows a block diagram of a luminance signal separating means B and a luminance signal scanning line interpolation means C of an image signal correction circuit comprising a Y and C signal separating circuit and a scanning line correction circuit connected in series. FIG. 1 denotes an input terminal 1; an analog-to-digital converter 7 (hereinafter referred to as ADC) which converts a composite analog color television signal received at the input terminal 1 to a digital signal; a frame memory 8 which delays the signal from the ADC 7 by one frame period a line comb filter 9 which separates a luminance (Y) signal and a chrominance (C) signal in the same field from the output signal of the ADC 7 (hereinafter referred to also as "performs an intrafield Y and C signal separation"); a frame comb filter 10 which receives the input and output signals of the frame memory 8 and separates the Y and C signals from those signals (hereinafter referred to also as "performs an interframe Y and C signal separation"); a motion detector 11 which receives the input and output signals of the frame memory 8 and detects the motion of the picture; a first mixer 12 which mixes the output signals from the comb filters 9 and 10 and also receives the output signal of the motion detector 11 to control the mixture ratio of those output signals; a line memory 13 which delays the output signal of the first mixer 12 by 1 H (one horizontal scanning period); an adder 14 which receives and adds the input and output signals of the line memory 13; a coefficient circuit 15 which multiplies by a factor of 2 the output signal of the adder 14; a first field memory 16 which delays the output signal of the first mixer 12 by one field period; a second mixer 17 which mixes the output signal of the coefficient circuit 15 and the output signal of the first field memory 16 and receives the output signal of the motion detector 11 as a control signal; a double-speed converter 18 which receives the output signals of the first and second mixers 12 and 17 and converts these signals to a progressive scanning television signal; and a digital-to-analog converter 19 (hereinafter referred to as DAC) which converts the digital signal from the double-speed converter 18 to an analog signal; and an output terminal 43.

The frame comb filter 10 separates the Y and C signals for a still image using the correlation between signal portions spaced by one frame period by addition of and substraction between adjacent frames. The line comb filter 9 separates Y and C signals for a moving picture using the correlation between adjacent lines in the same field. The mixture ratio of signals in the first mixer 12 is controlled by a signal indicative of the magnitude of the motion of the picture detected by the motion detector 11. If the magnitude motion of the picture is smaller than a predetermined value, the output signal, of the frame comb filter 10 is selected and outputted. Otherwise, if the magnitude of the motion of the picture is larger than a predetermined value the output signal of the line comb filter 9 is mainly selected and output.

A scanning line interpolation will now be described. In the interlace scan employed in the NTSC system, a position where an interpolation scanning line is to be formed in a field is scanned by the signal one field before. Therefore, in a still picture, the scanning line signal one field before may be used intactly as an interpolation scanning line. As will be recalled, such an interpolation between fields would rather deteriorate a moving picture, so that an interpolation scanning line signal for the moving picture is obtained by averaging two successive lines in the same field in the particular example. The mixture ratio of the input signals to the second mixer 17 is controlled by the output signal of the motion detector 11. If the motion of the picture is smaller than a particular value, the output signal of the first field memory 16 is selected and outputted. Otherwise, if the magnitude of motion of the picture is than a predetermined valve, the output signal from the coefficient circuit 15 is selected and outputted.

The double-speed converter 18 receives the output signals of the first and second mixers 12 and 17 as the current scanning line signal and the interpolation scanning line signal, respectively, compresses the time-base of these signals to one half, selects the current scanning line and the interpolation scanning line alternately for each scanning line, and sequentially outputs the selected signal as a progressive scanning signal.

If a non-standard signal such as a VTR reproduction signal which does not strictly keep the standards of the standard color television signal is processed on the presumption that the non-standard signal is a standard signal in the conventional example, the image quality would rather be deteriorated.

The signal processing in the conventional example is as shown in FIGS. 2A and 2B where the axis of abscissas represents the timebase and the axis of ordinates represents a vertical side of the screen. An circle represents a scanning line signal, a S(n) represented by a double circle in a Mth field denotes a signal input to the ADC 7.

As shown in FIG. 2A, for a still picture, Y and C signals are separated by the calculation on S(n) and S(n −525) to provide the current scanning line signal. The interpolation scanning line signal comprises a one-field period delayed version of the current scanning line signal and is calculated from S(n −263) and S(n−788). Therefore, the center of gravity of the image in the direction of the timebase, which is defined by a position on the timebase which is occupied by a particular image constituted by the current scanning line and interpolation scanning line positioned in different dimensions on the timebase, is between (M − 1)th and (M − 2)th fields.

As shown in FIG. 2B, for a moving picture, the separation of Y and C signals is performed by the calculation on S(n) and S(n − 1), and an interpolation scanning line signal is calculated by averaging one-delayed versions of S(n) and S(n − 1). Since the calculations are all performed in the same field, the center of gravity of the image in the timebase direction is in the Mth field.

This conventional image signal correction circuit does not have measures for coping with an input non-standard signal such as a VTR reproduction image which does not strictly keep the standards of the standard color television signal. Since the correction circuit has no measures to handle still and moving picture signals having different centers of gravity in the timebase direction, the center of gravity of the still picture signal and the center of gravity of the moving picture signal are spaced by 1.5 fields on the timebase for a picture which may move or stop, so that the motion of the picture appears unnatural sometimes.

SUMMARY OF THE INVENTION

It is an object of the present invention to provide a picture signal correction circuit which solves the above problems and eliminates an unnatural motion of an image due to a deviation between the centers of gravity of a still picture and a moving picture, and a motion-adaptive image signal processor which uses the image signal correction circuit to process even a non-standard signal so as to provide a high quality picture.

In a first arrangement, the above object is achieved by an image signal processor comprising:

signal discriminating means including a standard/-non-standard signal determining circuit for determining whether the received image signal is a standard signal or a non-standard signal, a synchronizing signal generator for selecting and outputting one of a clock phase-locked to a color burst signal of the image signal and a clock phase-locked to a horizontal synchronizing signal in accordance with the output signal from the standard/non-standard signal determining circuit, and a first signal switching circuit for selecting one of an input image signal and a pair of Y and C signals separated in field from the input image signal in accordance with the output signal of the standard/non-standard determining circuit;

luminance signal separating means including a first delay circuit for delaying the output signal of the first signal switching circuit by about twice the vertical scanning period of the output signal, a first interframe processor for generating an interframe processing signal using the input and output signals of the first delay circuit, a first intrafield processor for processing a delayed version of the image signal from the first delay circuit in the same field of the image signal, a motion detector for detecting a signal indicative of the magnitude of motion of the image contained in the input image signal, and a first mixer for mixing the output signal of the first interframe processor and the output signal of the first intrafield processor in accordance with the magnitude of motion of the image detected by the motion detector;

luminance signal scanning line interpolating means including a second delay circuit for delaying the output signal of the first mixer by about a vertical scanning period, a second intrafield processor for processing the output signal of the first mixer in the same field, a second mixer for mixing the output signals of the second delay circuit and the second intrafield processor in accordance with the magnitude of the motion of the image detected by the motion detector, and means for synthesizing the outputs signal of the first and second mixers;

color demodulating means including a filter for receiving the image signal and outputting a color band signal, a color demodulator for receiving the output signal of the filter and outputting two kinds of baseband color difference signals, and a multiplexer for multiplexing the two kinds of baseband color difference signals and outputting the result;

color difference signal separating means comprising a third delay circuit for delaying the output signal of the multiplexer by about twice the vertical scanning period of the output signal, a second interframe processor for generating an interframe processing signal from the input signal and output signal of the third delay circuit, a third intrafield processor for processing a delayed version of the image signal from the third delay circuit in the same field as the delayed image signal, a motion detector for detecting the magnitude of motion of the image contained in the input image signal, and a third mixer for mixing the output signal of the second interframe processor and the output signal of the third intrafield processor in accordance with the magnitude of motion of the image detected by the motion detector; and signal scanning line interpolating means comprising a fourth intrafield processor for processing the output signal of the third mixer in the same field as the output signal, a first separator for separating the output of the third mixer into two color difference signals, a second separator for separating the output signal of the fourth intrafield processor into two color difference signals, and means for receiving the output signals of the first and second separators one by one and synthesizing these output signals and outputting the result.

The luminance signal separating means, luminance signal scanning line interpolating means, color demodulating means, color difference signal separating means, and color difference signal scanning line interpolating means, excluding the signal discriminating means, cooperate to function as the image signal correction circuit.

In a second arrangement, the luminance signal separating means may include a first delay circuit for delaying the output signal of the first signal switching circuit by about twice the vertical scanning period of the output signal, a first interframe processor for generating an interframe processing signal from the input and output signals of the first delay circuit, a first intrafield processor for processing the image signal output by the first signal switching circuit in the same field as the image signal, a motion detector for detecting the magnitude of motion of the image contained in the input image signal, and a first mixer for mixing the output signal of the first interframe processor and the output signal of the first intrafield processor in accordance with the magnitude of motion of the image detected by the motion detector.

The luminance signal scanning line interpolating means may include a second delay circuit for delaying the output signal of the first mixer by about a vertical scanning period, a second intrafield processor for processing the output signal of the second delay circuit in the same field as the output signal, a second mixer for mixing the output signal of the first mixer and the output signal of the second intrafield processor in accordance with the magnitude of motion of the image detected by the motion detector, and means for synthesizing the output signals of the second delay circuit and of the second mixer.

The color difference signal separating means and the color difference signal scanning line interpolating means may include a signal delay mechanism of similar frame memories or field memories.

In the first and second arrangements, the standard/non-standard signal determining circuit determines whether the input television signal is a standard or a non-standard signal and controls the synchronizing signal generator and the first signal switching circuit. Upon receiving a standard signal, the synchronizing signal generator generates a clock phase-locked to the color burst signal, and the third signal switching circuit intactly selects and outputs the input television signal. Upon receiving a non-standard signal, the synchronizing signal generator generates a clock phase-locked to the horizontal synchronizing signal, the first signal switching circuit selects and outputs Y and C signals separated in a field rom the input television signal.

In the first arrangement, in order to process a signal for a moving picture, the input signal to the first intrafield processor which separates Y and C signals includes the output signal of the first delay circuit, and the input signal to the second intrafield processor which forms an interpolation scanning line includes the output signal of the first mixer.

In the second arrangement, in order to process a signal for a moving picture, the input signal to the first intrafield processor which separates Y and C signals includes the output signal of the first signal switching circuit, and the input signal to the second intrafield processor which forms an interpolation scanning line includes the output signal of the second delay circuit.

The first and second arrangements prepare a still picture signal using the output signal of the first mixing circuit and a delayed version of the output signal of the circuit from the second delay circuit.

By the above arrangements, motion-adaptive processing for high quality is performed irrespective of whether the input television signal is a standard one or a non-standard one. At this time, since the difference between the still and moving picture signals on the timebase is reduced, the motion of the picture does not become unnatural even if the image signal correction circuit operates so as to select one of the still and moving picture modes.

BRIEF DESCRIPTION OF THE DRAWINGS

FIGS. 2A and 2B illustrate the center of gravity of an image in the conventional combination shown in FIG. 1 in the timebase direction;

FIGS. 3, 3A, and 3B are a block diagram of a basic embodiment of an image signal processor using an image signal correction circuit according to the present invention;

FIGS. 4A and 4B illustrate the position of the center of gravity of an image associated with the embodiment of FIG. 3 in the timebase direction;

FIGS. 5, 5A, and 5B are is a block diagrams of a second embodiment;

FIGS. 7A and 7B illustrate the position of the center of gravity of an image associated with the embodiment of FIGS. 5 and 6 in the timebase direction;

FIG. 8, 8A, and 8B are a block diagrams of a third embodiment;

FIG. 9, 9A, and 9B are a block diagrams of a modification of the third embodiment;

FIGS. 10, 10A, and 10B are is a block diagrams of a fourth embodiment;

FIGS. 11A and 11B illustrate the position of the center of gravity of an image in the fourth embodiment in the timebase direction;

FIG. 12, 12A and 12B are a block diagram of a fifth embodiment;

FIG. 13 is a block diagram of a first modification of the luminance signal separator B and the color difference signal separator B' of the fifth embodiment;

FIG. 14 is a block diagram of a second modification of the luminance signal separator B and the color difference signal separator B';

FIG. 15 is a block diagram of a third modification of the luminance signal separator.

DESCRIPTION OF THE PREFERRED EMBODIMENTS

Figure 1:
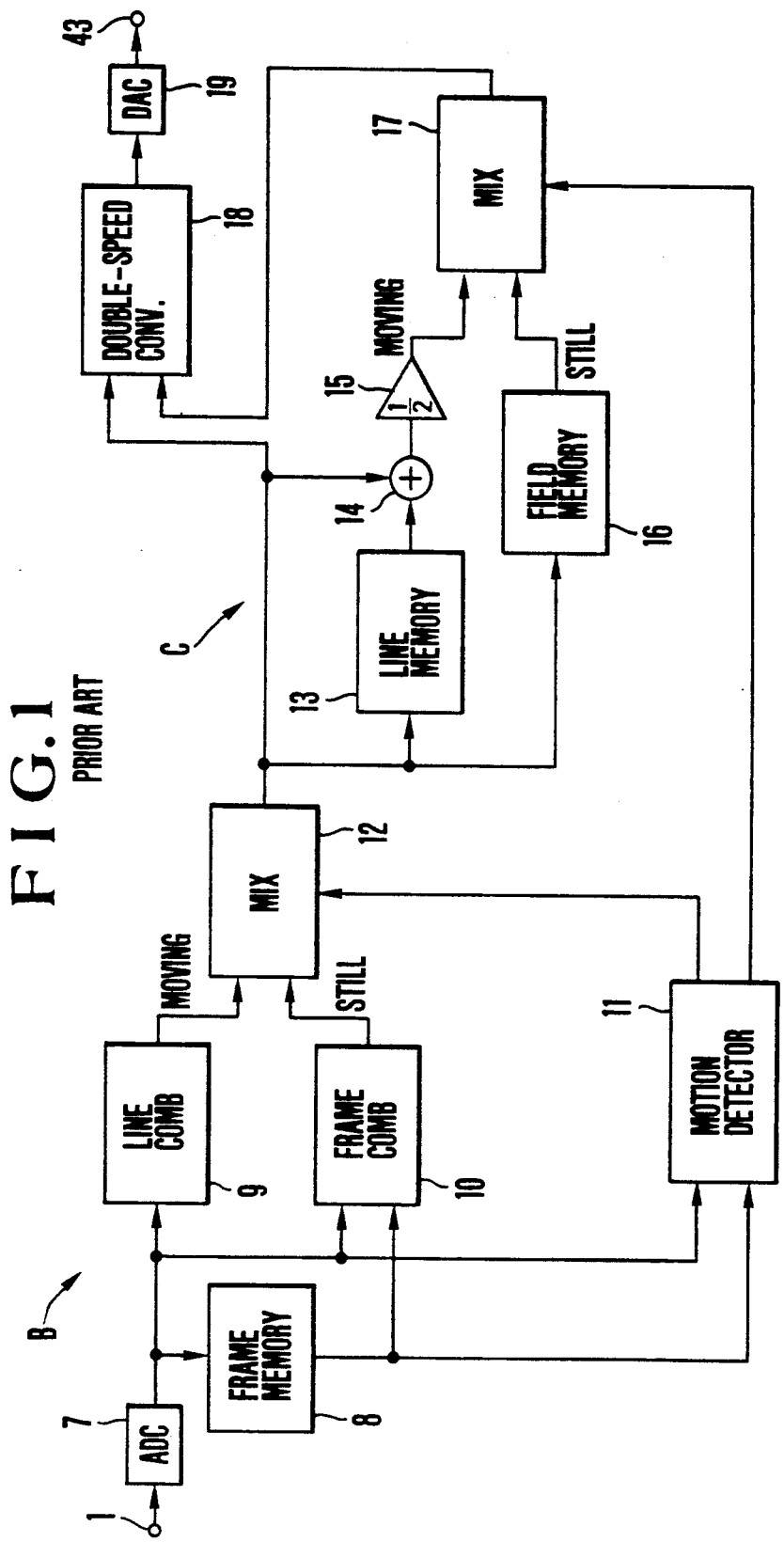
FIG. 1 is a block diagram of a conventional combination of a luminance signal separator and a luminance signal scanning line interpolator.

Embodiments of the present invention will now be described with reference to the drawings. FIG. 3 shows one embodiment of an image signal correction circuit according to the present invention and an image signal processor which includes the image signal correction circuit. The image signal correction circuit comprises a luminance signal separator B, a luminance signal scanning line interpolator C, a color demodulator D, a color difference signal separator B', a color difference signal scanning line interpolator C' and a signal output E. The image signal processor includes the image signal correction circuit and a signal discriminator A provided on the image signal input side of the image signal correction circuit.

The signal discriminator A includes a standard/non-standard signal determining circuit 2 which determines whether an analog image signal such as a television signal received at an input terminal 1 is a standard signal or not; a synchronizing signal generator 3 selects and outputs one of a clock phase-locked to a color burst signal of the input image signal and a clock phase-locked to a horizontal synchronizing signal in accordance with the result of the determination by the standard/non-standard signal determining circuit 2; a first line comb filter 4 which separates the composite image signal received at the input terminal into Y and C signals; a first switch 5 which selects the signal at the input terminal 1 if the input analog signal is determined to be a standard signal in accordance with the result of the determination by the standard/non-standard signal determining circuit 2 and selects the luminance (Y) signal separated by the line comb filter 4 if the inputted analog signal is determined to be a non-standard signal and a second switch 6 which selects one of the signal received at the input terminal 1 and the chrominance (C) signal separated by the filter 4.

The standard/non-standard signal determining circuit 2 used in the signal discriminator A is disclosed in Japanese Patent Publication-63-276994 entitled "Signal Processor for a Digital Television Receiver" (corresponding to U.S. Application Ser. No. 164,914 field by Murata, Arai and Nakagawa).

The luminance signal separator B includes a first ADC 7 which converts the analog image signal selected by the first switch 5 to a digital signal; a first frame memory 8 which delays the digital signal from the first ADC 7 by one frame period of the signal; a second line comb filter 9 which separates Y and C signals in a field from the output signal of the first frame memory 8; a first frame comb filter 10 which receives the input and output signals of the frame memory 8 and separates Y and C signals using adjacent frames; a motion detector 11 which receives the input and output signals of the first frame memory 8 and detects the motion of the image from adjacent frames; and a first mixer 12 which mixes the output signal of the second line comb filter 9 and the output signal of the first frame comb filter 10 with the mixture ratio of those signals being controlled by the output signal of the motion detector 11.

The luminance signal scanning line interpolator C includes a first line memory 13 which delays the output signal of the first mixer 12 by 1 H (one horizontal scanning interval); a first adder 14 which receives the input and output signals of the first line memory 13 and adds those signals; a first coefficient circuit 15 which multiples by a factor of 2 the output signal of the first adder 14; a first field memory 16 which delays the output of the first mixer 12 by one field period; a second mixer 17 which mixes the output signal of the first coefficient circuit 15 and the output signal of the first field memory 16 with the mixture ratio of those signals being controlled by the output signal of the motion detector 11; and a first double-speed converter 18 which receives the output signals of the first and second mixers 12 and 17 and converts these signals sequentially to corresponding television signals.

The first line memory 13, the first adder 14 and the first coefficient circuit 15 of the luminance signal scanning line interpolator C constitute an intrafield processor.

The color demodulator D includes a bandpass filter (BPF) 20, an ACC amplifier 21, a color demodulating circuit 22, a second ADC 23, a third ADC 24 and a multiplexer 25.

The color difference signal separator B' which receives the output signal of the color demodulator D includes a second frame memory 26, a third line comb filter 27, a second frame comb filter 28 and a third mixer 9 like the luminance signal separator B. While the luminance signal separator B and the color difference signal separator B' have been illustrated as having a common motion detector 11, they may have corresponding separate motion detectors.

The motion detector 11 used in the luminance signal separator B and in the chromatic signal separator B' are disclosed in JP-A-63-90987 (corresponding to U.S. Application Ser. No. 105,013 field by Sugiyama et al.).

The color difference signal scanning line interpolator C' includes a second line memory 30, a second adder 31 and a second coefficient circuit 32, these elements constituting an intrafield processor, and a first and a second separator 33 and 34 and a second and a third double-speed converter 35 and 36, like the luminance signal scanning line interpolator C.

The signal output unit E includes a first DAC 19 which converts the digital output of the luminance signal scanning line interpolator C to an analog signal, and a second and a third DAC 37 and 38 which convert the two outputs of the color difference signal scanning line interpolator C' to corresponding analog signals, and a matrix circuit 39 which receives the output signals of these three DACs, performs a matrix operation on these signals and outputs R, G and B signals.

The operation of the circuit of FIG. 3 will be described with reference to still-picture processing performed when a standard signal is received, moving picture processing performed when a standard signal is received and processing performed when a non-standard signal is received.

(1) Still Picture Processing Performed when a Standard Signal is Received

First, assume that the received television signal is standard one, the motion of the picture is small, the result of the detection by the motion detector shows the presence of a still image, and the circuit is in the still picture mode.

The synchronizing signal generator 3 generates a clock signal phase-locked to the color burst signal of the received television signal, a horizontal synchronizing signal and a vertical synchronizing signal. The first switch 5 selects the television signal from the input terminal 1 and delivers it to the first ADC 7, the sample frequency which is required to be twice the frequency band of the television signal in conformity to sampling theorem. For example, about 14.3 MHz which is four times the color sub-carrier frequency $f_{sc}$ is generally used. The first mixer 12 selects and provides the output signals of the frame comb filter 10 as Y and C separated signals for a still picture. The second mixer 17 selects and provides the output signal of the first field memory 16 as an interpolation scanning line signal for the still picture. The first double-speed converter 18 receives the output signals of the first and second mixers 12 and 17 as the current scanning line signal and the interpolation scanning line signal, respectively, and compresses these signals with reference to time, switches between the current scanning line and interpolation scanning line for each scanning line and outputs these signals as sequential scanning signals. The timebase compression is easily realized, for example, by using a line memory and a read clock of twice the frequency of a write clock.

The second switch 1 selects a television signal from the input terminal 6 and delivers it to a BPF 20, which then outputs a signal in a chrominance signal band centered at the color sub-carrier frequency $f_{sc}$. The ACC amplifier 21 acts to constantly maintain the level of the color burst signal contained in the output signal from the BPF 20 and outputs a signal having a substantially constant chrominance signal level obtained by correcting fluctuations of the chrominance signal level due to the frequency characteristic of the transmission path. The color demodulating circuit 22 demodulates the received chrominance signal in the chrominance signal band and outputs two kinds of baseband color difference signals. The multiplexer 25 receives two digital color difference signals from the second and third ADCs 23 and 24 and outputs these signals alternately on a timebase multiplexing basis. The band width of the color difference signal in the baseband is narrow namely, about 0.5–1.5 MHz, compared to the one of the luminance signal of about 4.2 MHz, so that the sample frequency of the color difference signals may be ¼ of the sample frequency of the luminance signal. Therefore, even if the two color difference signals are processed together by timebase multiplexing, the operational speed of the processor is half the operational speed of the luminance signal processor, and there are no problems. By this timebase multiplexing, the size of the circuit for color difference signal processing is reduced.

The second frame comb filter 28 performs an interframe Y and C signal separating operation on a signal comprising two multiplexed color difference signals and eliminates the high-frequency region components of the luminance signal mixed in the two color difference signals. The third mixer 29 selects and provides the output signal of the second frame comb filter 28 as a still-picture color difference signal.

The second line memory 30, second adder 31 and second coefficient circuit 32 average two adjacent scanning line signals in the same field from the output signal of the third mixer 29 and output the resulting signal. The output signal of the second coefficient circuit 32 and the output signal of the third mixer 29 are inputted as th interpolation scanning line signal and the current scanning line signal to the first and second separators 33 and 34, respectively, which demultiplex the corresponding multiplexed color difference signals and outputs the results. The second and third double-speed converters 35 and 36 receive the current scanning line signal and interpolation scanning line signal for the two color difference signals, time-compress those signals to one half, alternately selects one of the current scanning line and the interpolation scanning line for each scanning line and outputs the selected signal to thereby provide a progressive scanning signal.

The output signals from the first, second and third double-speed converters 18, 35 and 36 are converted by the first, second and third DACs 19, 37 and 38 to corresponding analog signals. The matrix circuit 39 receives a sequential scanning luminance signal and two color difference signals converts these signals to R, G and B signals and outputs them.

FIGS. 4A and 4B illustrate the relationship in time between the signal processing steps in the particular embodiment. The current scanning line signal is calculated together with the luminance signal and the color difference signals from the signals in the Mth and (M−2)th fields in FIG. 4A. The interpolation scanning line signal for the luminance signal is a one-field period delayed version of the luminance signal, so that it is calculated from the signals in the (M−1)th and (M−3)th fields. The interpolation scanning line signal for the color difference signals is in the same field as the current scanning line signal, so that it is calculated from the signals in the Mth and (M−2)th fields.

As shown in FIG. 4A, the center of gravity of the luminance signal in the timebase direction in the still picture mode lies between the (M−1)th and (M−2)th fields. The center of gravity of the color difference signals lies in the (M−1)th field.

(2) Processing of a Moving Picture Performed when a Standard Signal is Received

In the moving picture mode, the first mixer 12 selects and provides the output signal of the second line comb filter 9 as separated Y and C signals for the moving picture. The second mixer 17 selects and provides the output signal of the coefficient circuit 15 as the interpolation scanning line signal for the moving picture. The first double-speed converter 18 receives the output signals of the first and second mixers 12 and 17 and sequentially converts these signals to scanning signals and outputs them as in the still picture mode.

The third mixer 29 selects and provides the output signal of the third line comb filter 27 as the color difference signal for a moving picture. The subsequent operations are the same as those described above with reference to the still picture 30 further description thereof will be omitted.

The features of the embodiment of FIG. 3 lie in the fact that the output signal of the first frame memory 8 is inputted to the second line comb filter 9 used in the moving picture mode, and that the output signal of the second frame memory 26 is inputted to the third line comb filter 27. Therefore, the center of gravity of the image for both the luminance signal and the color difference signal in the moving picture mode and in the timebase direction are in the (M−2)th field in FIG. 4B.

As just described above, according to the particular embodiment, the difference in timebase between the still picture signal and the moving picture signal is suppressed to 0.5 fields for the luminance signal. For the color difference signal a similar difference is suppressed to one field. This value is large compared to the deviation of the center of gravity of the luminance signal, but small compared to 1.5 fields in the conventional example. The deviation of the center of the gravity of the color difference signal is not so noticeable to the human eyes compared to that of the luminance signal, so that there are no problems. Therefore, even if the image moves or stops, the motion of the image is prevented from appearing unnatural. The output signals from the first and second frame memories 8 and 26 processed as the moving picture signals are in an even or odd field if the input signal received at the input terminal 1 is also in an even or odd field and the scanning line at the same position as the input signal is processed, so that they are difficult to be influenced by possible jitters contained in the input signal.

(3) Processing Performed when a Non-Standard Signal is Received

The operation of the VTR performed when the received television signal is a non-standard signal will be described. The synchronizing signal generator 3 generates a clock signal phase-locked to the horizontal synchronizing signal of the received television signal, a horizontal and a vertical synchronizing signals. The first switch 5 selects and provides the luminance signal processed and outputted by the first line comb filter 4. The second switch 6 selects and provides a chrominance signal processed and outputted by the first line comb filter 4.

When the non-standard signal is received, the line comb filter 4 of the analog circuit separates Y and C signals, so that the frame comb filters 10 and 28 and the line comb filters 9 and 27 function as a motion-adaptive noise reducer to reduce noise, and not as the Y and C signal separating circuits. The subsequent operations are the same as those performed when the standard signal is received and further description thereof will be omitted.

As just described above, in the particular embodiment, Y and C signals are separated by the line comb filter when a non-standard signal is received, noise is therefore reduced by the motion-adaptive noise reducer and the motion-adaptive scanning line interpolation is performed to thereby provide a high-quality image. The deviation in the center of gravity between the moving picture and the still picture is improved as is done when a standard signal is received to thereby prevent the motion of the picture from appearing unnatural.

In the particular embodiment, the scanning line interpolation for the color difference signals is done by averaging adjacent upper and lower scanning line signals in the same field for both the moving picture and the still picture because improvements to the vertical resolution and line flickers obtained by an intrafield interpolation for the scanning line interpolation of the color difference signals are not marked compared to the scanning line interpolation of the luminance signal. Therefore, a deterioration of the image is not so noticeable even if only an intrafield interpolation is used, so that the field memory and mixer for the color difference signals can be removed.

Of course, the color difference signals may be subjected to motion-adaptive scanning line interpolation like the luminance signal. In this case, the deviation in the center of gravity between the moving picture and the still picture for the color difference signal may be suppressed to 0.5 field or less, so that the image quality is further improved.

While in the above embodiment the output signal of the frame memory is selected as a reference signal for the moving picture signal, the present invention is not limited to this selection. The output of the field memory may be selected as the reference signal for the moving picture signal.

Figure 5B:
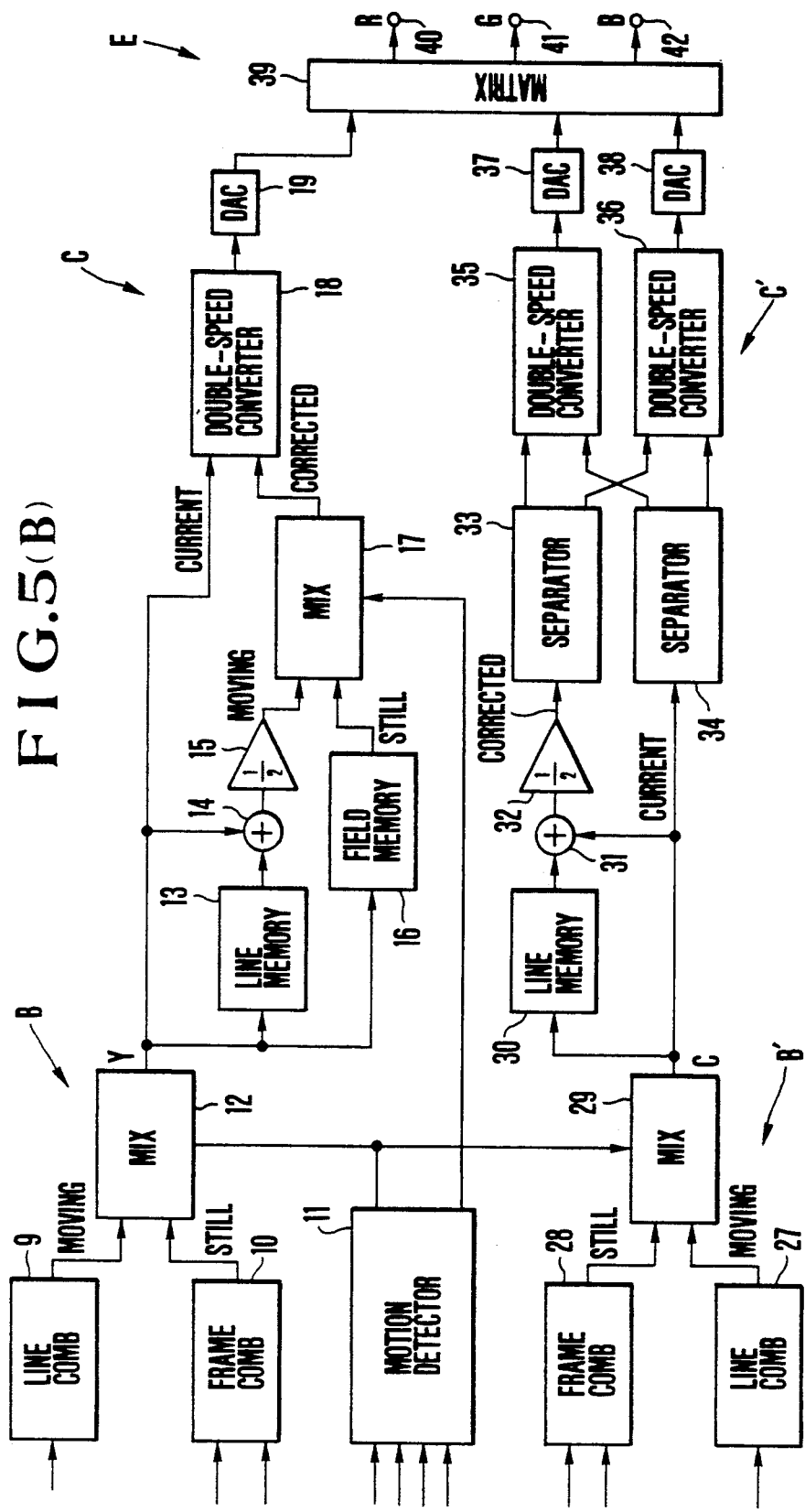

FIG. 5 is a block diagram of another embodiment of the present invention. In FIG. 5, reference numerals 44 and 45 denote a second and a third field memory, respectively. Like reference numerals identify like components in FIGS. 5 and 1. In the particular embodiment, only a luminance signal will be described for simplifying purposes. The circuit arrangement for the color difference signal is, of course, similar to that for the luminance signal, as shown.

In the particular embodiment, the frame memory includes two cascaded field memories 44 and 45. The second line comb filter 9 receives the output signal of the second field memory 44 and outputs Y and C separated signals for a moving picture. The remaining operations are the same as the corresponding ones of the embodiment of FIG. 1 and further description thereof will be omitted.

FIGS. 7A and 7B illustrate the position of center the of gravity of the image on the timebase. The position of the center of gravity of the image in the still picture mode lies between the (M−1)th and (M−2)th fields as in the previous embodiment. The center of gravity of the image in the moving picture is in the (M−1)th field.

In the particular embodiment, the difference on timebase between the still picture signal and the moving picture signal is suppressed to 0.5 fields. The still picture signal and the moving picture signal coincide in vertical center of gravity. Therefore, even if the image moves or stops, the motion of the image is prevented from appearing unnatural.

A reference signal for a moving picture signal is the output signal of the second field memory 44, so that the difference in time between the final image obtained with a time delay as the result of the adaptive processing and a corresponding voice which flows with a received time series can be reduced.

Figure 6:
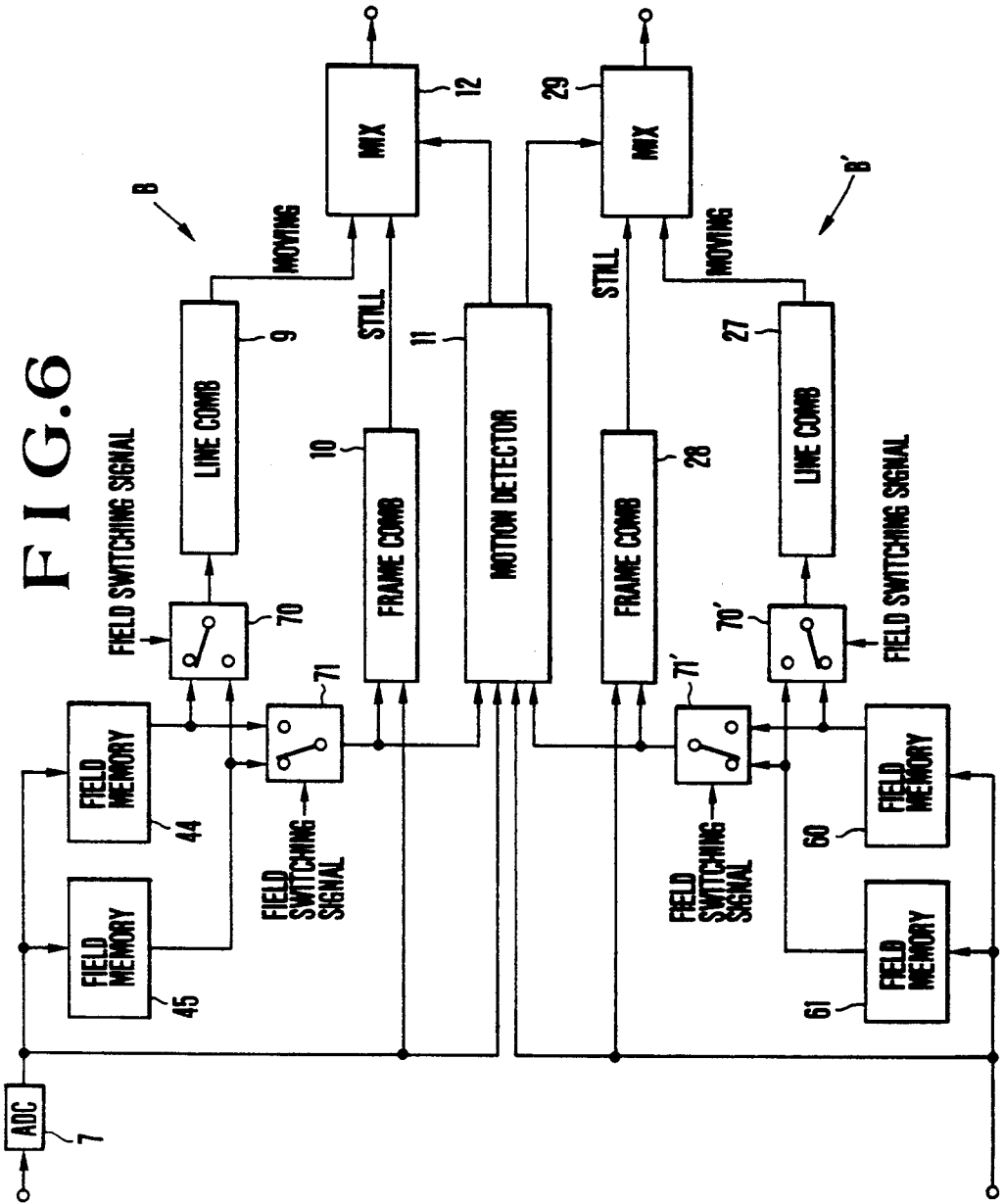
FIG. 6 is a block diagram of a modification of a combination of the luminance signal separator B and a color difference signal separator B' of the second embodiment shown in FIG. 5.

FIG. 6 illustrates a modification of the luminance signal separator B and the color difference signals separator B' of the FIG. 5 arrangement, in which the digital output of ADC 7 is inputted to the two cascaded field memories 44 and 45 while the modification of FIG. 6 includes two field memories 44 and 45 connected in parallel at the output of the ADC 7. Further, in this modification, selectors 70 and 71 are provided to select the outputs of the field memories 44 and 45. The output of the selector 70 is inputted to the line comb filter 9, and the output of the selector 71 is inputted to the frame comb filter 10 and the motion detector 11. In the luminance signal separator B of FIG. 6, data is written into the field memories 44 and 45 alternately by each 1 field. The selectors 70 and 71 are alternately switched for each field, and the selector 71 selects data read from the field memory in which data is written so as to provide one frame delay at all times. The switch 70 selects data read from the other field memory so as to provide one field delay at all times. If the luminance signal separator B of FIG. 6 is employed, the color difference signal separator B' of the color difference signal processing system may be constituted so as to include parallel connected field memories to thereby allow alternate data writing like the luminance signal system as shown in FIG. 6, or may intactly employ the current structure of FIG. 5. In any case, for switching purposes, the selectors 70, 71 and 70', 71' may use a field switching signal which can easily be produced from a synchronizing signal usually used for synchronizing the circuit operations.

Figure 8B:
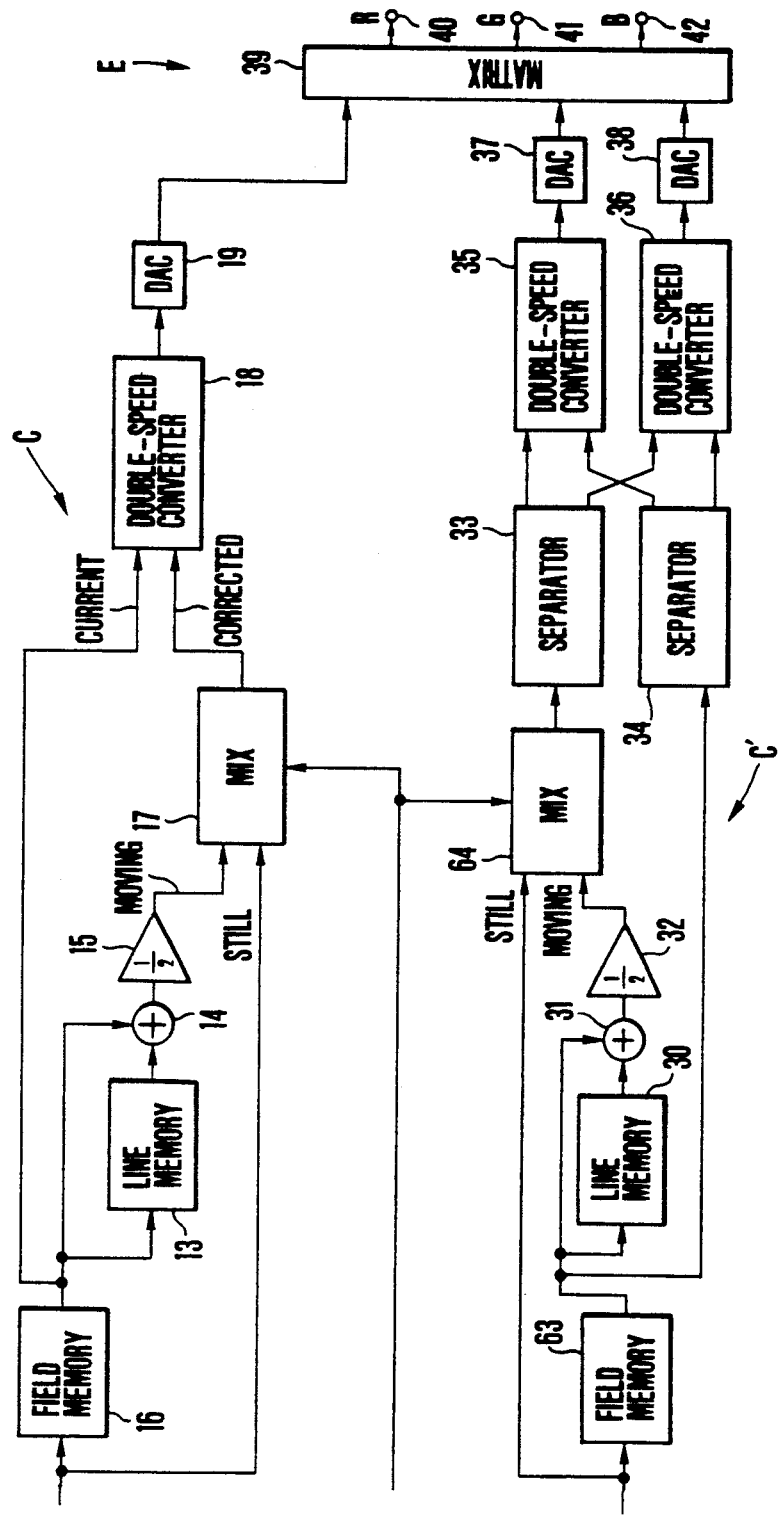

FIG. 8 illustrates a further embodiment of the present invention in which the Y and C separation structure including the blocks A, D, B and B' are the same as the corresponding ones of the conventional one and a further description thereof will be omitted.

The features of the particular embodiment lie in the provision of delay field memories 16 and 63 at the input stages of the intrafield processors including the elements 13, 14, 15 and 30, 31, 32 of the luminance signal scanning line interpolator C and the color difference signal scanning line interpolator C' and the provision of a further mixture 64 which mixes the outputs of the elements 29 and 32. The output signal of the first mixer 12 is delayed by one field period by the first field memory 16, the interline average is calculated by the first line memory 13, first adder 14 and first coefficient circuit 15 for use as a moving picture interpolation scanning line signal. One of the output signals of the first mixer 12 as a still picture interpolation scanning line signal and the output signal of the first coefficient circuit 15 is selected by the second mixer 17 in accordance with the magnitude of motion of the picture detected by the detector 11 and outputted as an interpolation scanning line signal. The first double-speed converter 18 receives the output signal of the first field memory 16 as the current scanning line signal, and the output signal of the second mixer 17 as an interpolation scanning line signal, and converts these signals to a progressive scanning signal and outputs the result.

The position of the center of gravity of the image on the timebase in the particular embodiment is similar to that in the embodiment of FIG. 5. In more detail, the position of the center of gravity of the image in the still picture mode lies between the (M−1)th and (M−2)th fields while the position of the center of gravity of the image in the moving picture mode lies in the (M−1)th field. Thus the particular embodiment, the difference in position of center of gravity between the still picture signal and the moving picture signal on the timebase is suppressed to 0.5 fields. Therefore, even if the image moves or stops, the motion of the picture is prevented from appearing unnatural.

FIG. 9 illustrates a modification of the embodiment of FIG. 8 which additionally includes a field memory 16 provided in the luminance signal scanning line interpolator C and fields memories 61 and 60 provided in the color difference signal separator B' to process a signal delayed by one-field period in order to produce effects equivalent to those produced by the embodiment of FIG. 8.

Figure 10B:
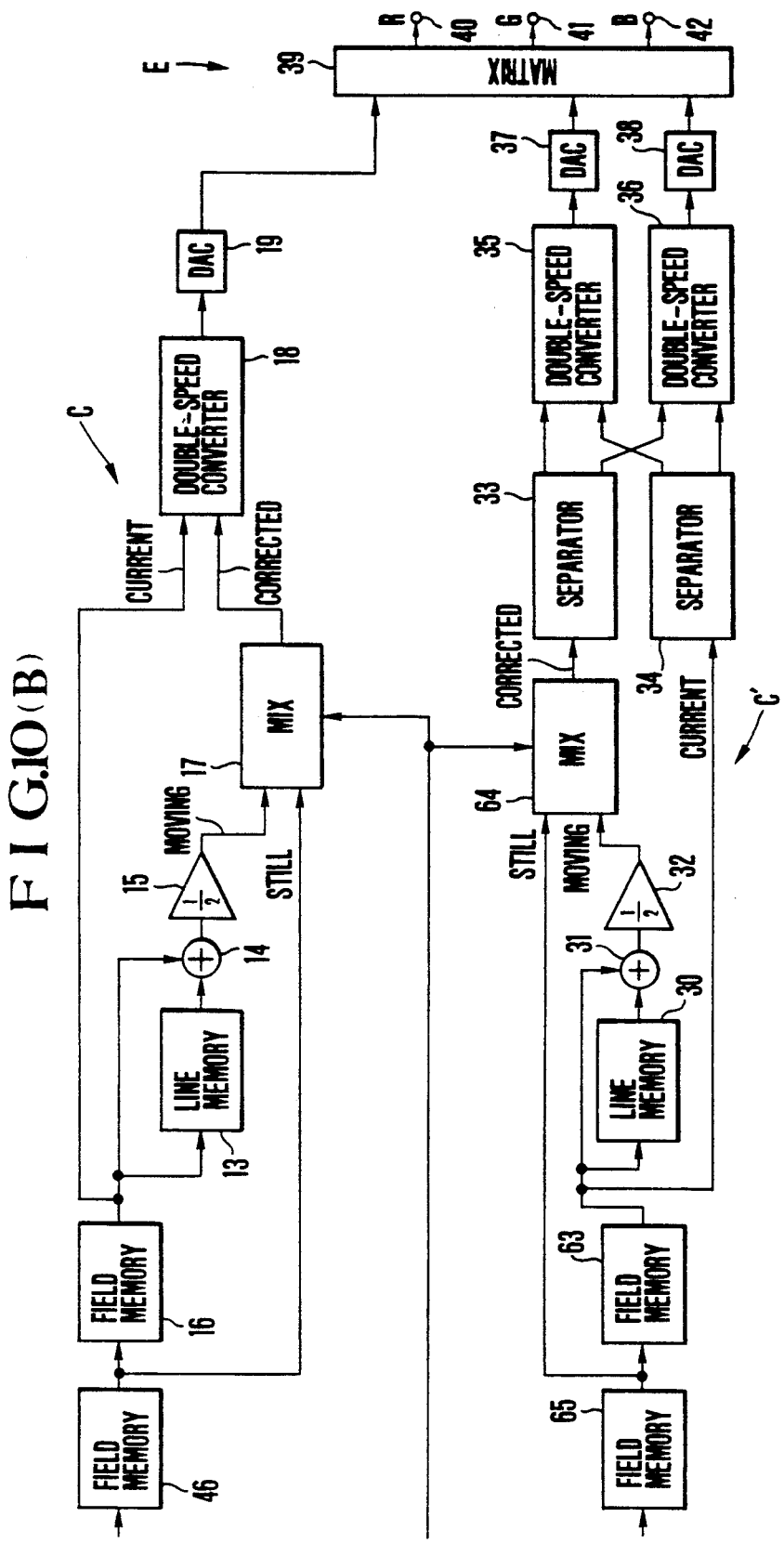

FIG. 10 shows another embodiment of the present invention which additionally includes a fifth field memory 46 and a sixth field memory 65 provided on the input sides of the luminance signal scanning line interpolator C and the color difference signal scanning line interpolator C', respectively. The remaining arrangement is the same as the corresponding one of FIG. 8. The embodiment of FIG. 10 is the same in structure and operation as that of FIG. 8 except that the output of the first mixer 12 is input to the fifth field memory 46, and that the output of the second mixer 29 is input to the sixth field memory 65.

FIGS. 11A and 11B illustrate the relationship in position between the center of gravities of pictures according to the particular embodiment on the timebase. In the particular embodiment, the difference in position between the centers of gravity of the still picture signal and the moving picture signal on the timebase can be suppressed to 0.5 fields and the motion of the picture is prevented from appearing unnatural. When the output signal of the first field memory 16 processed as the moving picture signal concerns an even or odd field, the input signal from the first ADC 7 to the block B also concerns an even or odd field, and the scanning line at the same position as the input signal is processed, so that it is difficult to be influenced by a possible jitter of the input signal.

While in the above embodiments the intrafield interpolation for the moving picture has been described as including an average interpolation for two upper and lower lines using the line memory, the present invention is not limited to it. For example, a re-write interpolation may be used which includes repeated use of the scanning line signal directly above the position of a scanning line to be interpolated by inputting the output of the first mixer 12 intactly in parallel to the double-speed converter 18. At this time, the smoothness of the image would be slightly lost, but the line memory, adder and coefficient circuit are unnecessary, so that the circuit size can be reduced.

Figure 12B:
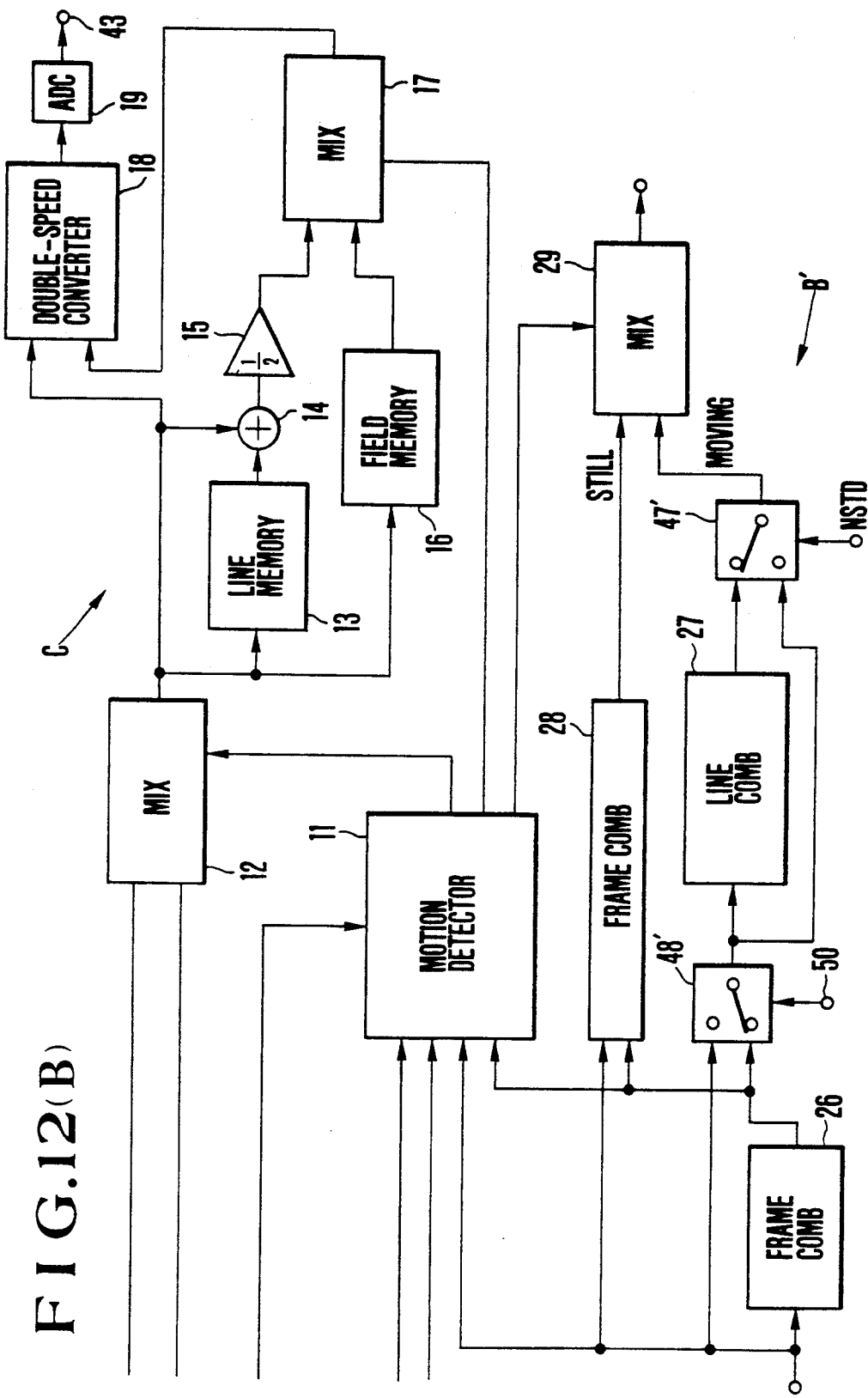

FIG. 12 shows another embodiment of the present invention which is the same in structure and function as the basic embodiment of FIG. 3 except at the luminance signal separator B and the color difference signal separator B', which will be mainly described in detail below. In the embodiment of FIG. 12, a first selector 47 is provided after the second line comb filter 9 in the luminance signal separator B to switch between the processed signal from the second line comb filter 9 and the signal input to the filter 9. At this time, the first selector 47 is controlled by output signal of the standard/non-standard signal determining circuit 2 such that if the input television signal is a non-standard one, the signal bypassing the filter 9 is selected and output because if the input television signal is a non-standard signal, the first line comb filter 4 separates Y and C signals, so that if the line comb filtering is performed twice, the passband would be reduced, and the image would be blurred.

In the particular embodiment, a second selector 48 is provided before the second line comb filter 9 to switch between the delayed signal from the first frame memory 8 and a non-delayed signal. A signal 50 to actuate the second selector 48 includes, for example, a signal from a manual still switch (not shown).

According to this arrangement, an image at a partiular instant can be held continuously by stopping the update of the first frame memory 8. During that time, display can be maintained by controlling the second selector 48 such that the selector 48 selects and outputs the output signal of the ADC 7 (the signal not delayed by the first frame memory 8). At this time, the output signals of the first ADC 7 and the first delay circuit 8 scan the same spatial position, so that no unnaturalness is created in the image by switching.

In the particular embodiment, a second line comb filter 9 and a LPF 51 are provided as a separator for Y and C signals in a field in the moving picture mode and one of the outputs of the filter 9 and LPF 51 is selected by a third switch 49 in order to inhibit hanging dots which would otherwise be created at a vertical edge of the picture in the television signal if same is processed by line comb filtering. If the vertical edge of the picture is detected by an edge detector 52, Y and C signal separation step using the LPF 51 is selected to prevent the occurrence of hanging dots.

The output signal of the edge detector 52 is input to the motion detector 11 to be used for control of the sensitivity of the motion detection in order to prevent a liable erroneous determination, due to noise or the like at an edge of the picture, that the picture is moving even if the picture is a still one. The edge detector 52 detects the horizontal and vertical edges of the picture and controls the motion detector 11 to provide such control that the sensitivity of the motion detection is reduced at the edge of the picture.

The color difference signal separator B' corresponding to the luminance signal separator B will now be described. The color difference signal separator B' includes a second selector 48' provided before the third line comb filter 27 to separate Y and C signals in a field to thereby select one of the signal delayed by one frame period from the third frame memory 26 and the non-delayed signal. A first selector 47' is provided behind the third line comb filter 9 to select one of the processed signal from the third line comb filter 27 and the non-processed signal. The first selector 47' is switched by the output of the standard/non-standard signal determining circuit 2 such that the current display is changed when a non-standard determining signal (shown by NSTD) is received. The second selector 48' is switched by the control signal 50.

FIG. 13 shows a first modification of the embodiment of FIG. 12. In this modification, only a first selector 47 is provided after the second line comb filter 9 of the luminance signal separator B. If a non-standard signal is received, the first selector 47 is bypassed to prevent the reduction of the passband due to double processing by the line comb filters and hence the occurrence of a blur of the picture.

In the first modification, the color difference signal separator B' of the color difference signal system may have the same structure as the luminance signal block B as shown or the separator B' of FIG. 3. Also in this case, the selector 47 is switched by the output of the standard/non-standard signal determining circuit 2 such that the current display is changed by the receipt of a non-standard determining signal (shown by NSTD).

FIG. 14 shows a second modification in which only a second selector 48 is provided before the second-line comb filter 9 to only select one of the delayed signal from the first frame memory 8 and the non-delayed signal. This arrangement may be applicable to a still function to continue to hold an image at any particular instant. In this second modification, as shown in FIG. 14, the color difference signal separator B' of the color difference signal system may have a structure similar to that of the color difference signal separator B' of the color difference signal system such that both the selectors 48 and 48' are switched at the timing of the same control signal 50.

FIG. 15 shows a third modification in which a single selection switch 49 is provided as an intrafield Y and C signal separator in the moving picture mode only behind the second line comb filter 9 and LPF 51. Also in this modification, the occurrence of hanging dots can be prevented when a vertical edge is detected by the edge detector 52 from the output of the frame memory 8.

Figure 16:
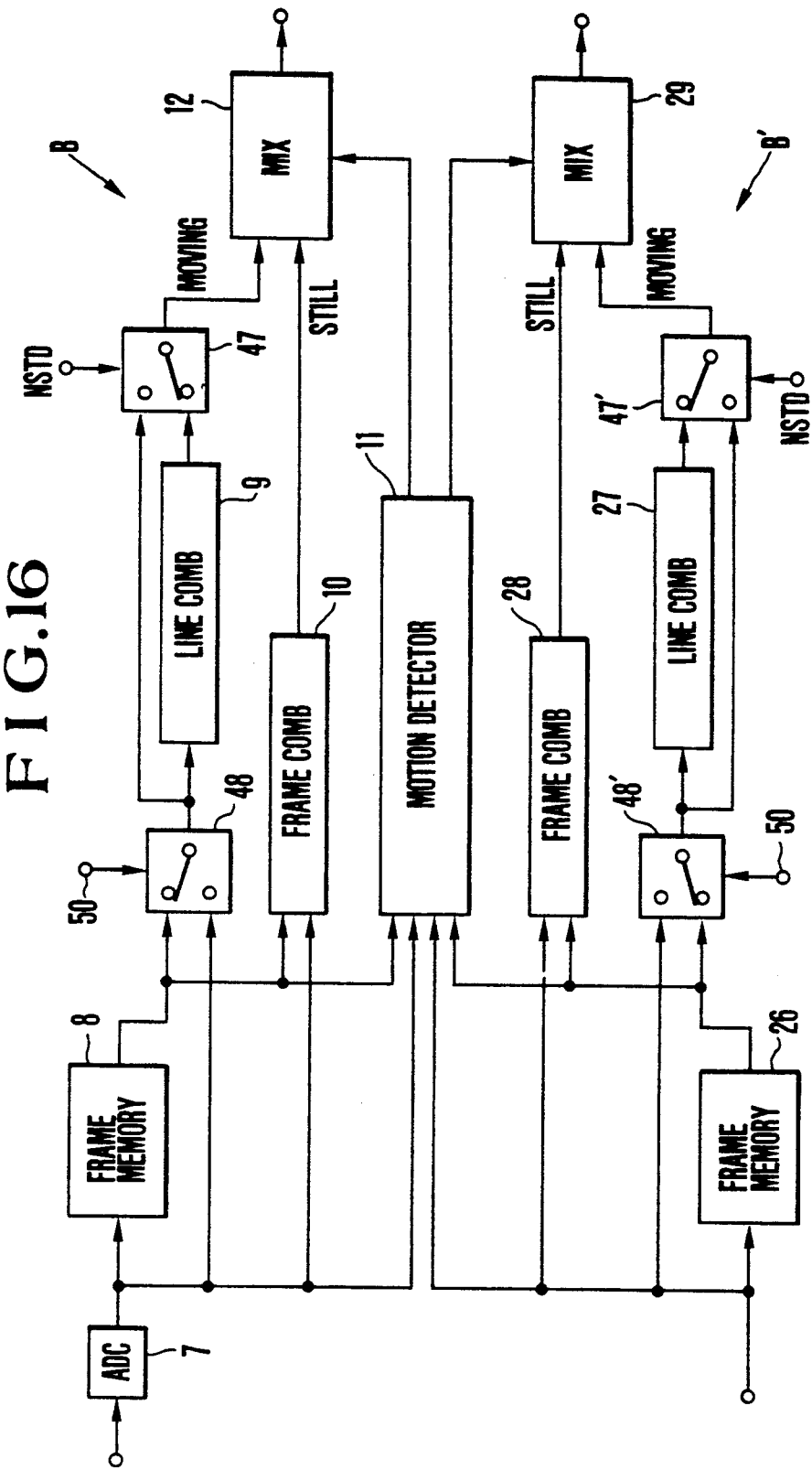
FIG. 16 is a block diagram of a fourth modification of the luminance signal separator B and the color difference signal separator B'.

FIG. 16 shows a fourth modification which includes a combination of the first and second modifications, wherein a second selector 48 is provided before the line comb filter 9 to select one of the delayed signal from the first frame memory 8 and the non-delayed signal. A first selector 47 is provided behind the second line comb filter 9 to select one of the processed signal from the second line comb filter 9 and the non-processed signal. As shown in FIG. 16, the color difference signal separator B' has a structure similar to that of the luminance signal separator B such that both the selectors 47 and 47' of the color difference signal separator B' and the luminance signal separator B are switched by the output of the standard/non-standard signal determining circuit 2, namely, such that the current display is changed by the reception of the non-standard determining signal (shown by NSTD in FIG. 16). The second selectors 48 and 48' are synchronously switched by the control signal 50. The fourth modification prevents the occurrence of a blur of a image and provides a still function by the combination of the preceding modifications.

Only the arrangements of FIGS. 14 and 15 may be used as a modification of the image signal correction circuit (constituted by the elements B, C, D, B' and C' of FIG. 3) among the embodiments of FIGS. 12-16 because the first selectors 47 and 47' are switched by the output of the standard/non-standard determining circuit 2.

As described above, the entire deviation of the center of gravity of the picture on the timebase generated conventionally in each of the Y and C signal separator and the scanning line interpolator is suppressed to one field or less to eliminate unnatural motion of the picture due to the deviation of the center of gravity of the picture by a combination of the two circuits where the moving picture signal is obtained from the output of the frame memory or field memory of one of the circuits.

The present invention may be applicable to television receivers as well as television signal processors such as video tape recorders (or players) or video disc players for providing a higher quality picture.

We claim:

1. A motion adaptive image signal correction circuit operated in a still picture signal processing or a moving picture signal processing response to movement of a picture, said circuit comprising:

luminance signal separating means having a difference in center of gravity on a time axis between said still picture signal processing and moving picture signal processing, said luminance signal separating means including a first delay circuit for receiving an image signal and delaying the image signal by about twice a vertical scanning period, a first interframe processor for receiving input and output signals from the first delay circuit to generate an interframe processed signal, a first intrafield processor for processing a delayed image signal from the first delay circuit in the same field a motion detector for detecting a motion of the image contained in the received image signal, and a first mixer for mixing the output signal of the first interframe processor and the output signal of the second interfield processor in accordance with a signal indicative of the magnitude of the motion of the image detected by the motion detector;

luminance signal scanning line interpolating means having an inverse difference in center of gravity on a time axis compared to said difference in center of gravity on time axis between said still picture signal processing and moving picture signal processing, said luminance signal scanning line interpolating means including a second delay circuit for delaying the output signal of the first mixer by about a vertical scanning period, a second intrafield processor for processing the output signal of the fixer mixer in the same field, a second mixer for mixing the output signal of the second delay circuit and the output signal of the second intrafield processor in accordance with the magnitude of the motion of the image detected by the motion detector, and a first synthesizing means for synthesizing the output signals of the first and second mixers;

color demodulating means including a filter for receiving the image signal and outputting a color band signal, a color demodulating circuit for receiving the output signal of the filter and outputting two kinds of baseband color difference signals, and a multiplexer for multiplexing the two kinds of baseband color difference signals and outputting an output signal;

color difference signal separating means including a third delay circuit for receiving the output signal of the color demodulating means and delaying the output signal by about twice the vertical scanning period of the output signal, a second interframe processor for receiving the input and output signals from the third delay circuit to generate an interframe processed signal for the input and output signals, a third intrafield processor for processing a delayed signal from the third delay circuit in the same field a third mixer for mixing the output signal of the second interframe processor and the output signal of the third intrafield processor in accordance with the magnitude of the motion of the picture detected by the motion detector; and color difference signal scanning line interpolating means including a fourth intrafield processor for processing the output of the third mixer in the same field, a first separator for separating the output of the third mixer into two color difference signals, a second separator for separating the output of the fourth intrafield processor into two color difference signals, and second and third synthesizing means for receiving the output of the first and second separators one by one and synthesizing the color difference signals, wherein said difference in center of gravity is decreased by mutual cancellation between said difference in center of gravity and said inverse center of gravity.

2. An image signal correction circuit according to claim 1, further comprising:

signal outputting means for receiving the output signal of the luminance signal scanning line interpolating means and the output signal of the color difference signal scanning line interpolating means, performing a matrix operation on these signals, and generating and outputting R, G and B signals.

3. An image signal correction circuit according to claim 1, wherein the first delay circuit of the luminance signal separating means comprises two serially connected vertical scanning period delay circuits, the first intrafield processor comprises a circuit to process in the same field the image signal delayed by one vertical scanning period in one of the vertical scanning period delay circuits constituting the first delay circuit, the third delay circuit of the color difference signal separating means includes two serially connected vertical scanning period delay circuits, and the third intrafield processor includes a circuit to process in the same field the image signal delayed by one vertical scanning period in one of the vertical scanning period delay circuits constituting the third delay circuit.

4. An image signal correction circuit according to claim 1, wherein the first delay circuit of the luminance signal separator includes two parallel connected vertical scanning period delay circuits, the luminance signal separating means including first and second selectors connected to the inputs of the first intrafield processor and the first intraframe processor switched in accordance with the output of the synchronizing generator for each field so as to receive separate delay signals alternately from both the vertical scanning period delay circuits, the third delay circuit of the color difference signal separating means includes two parallel connected vertical scanning period delay circuits, the color difference signal separating means including a third and a fourth selectors connected to the inputs of the third intrafield processor and the second intraframe processor and switched for each field in accordance with the output signal from the synchronizing generator so as to receive separate delay signals alternately from both the vertical scanning period delay circuits.

5. An image signal correction circuit according to claim 1, wherein the luminance signal separating means includes a selector provided before the first intrafield processor for selecting one of the input and output signals of the first delay circuit in accordance with a predetermined external signal and outputting the selected signal to the first intrafield processor, the color difference signal separating means includes a selector before the third intrafield processor for selecting one of the input and output signals of the third delay circuit in accordance with a predetermined external signal to output the selected signal to the third intrafield processor.

6. An image signal correction circuit according to claim 1, wherein the luminance signal separating means includes a low-pass filter for receiving the output signal of the first delay circuit, an edge detector and a selector for selecting one of the output signal of the first intrafield processor and the output signal of the low-pass filter in accordance with the output signal of the edge detector to output the selected signal to the first mixer.

7. An image signal correction circuit according to claim 1, wherein the first delay circuit includes a frame memory.

8. An image signal correction circuit according to claim 1, wherein the first intrafield processor includes a line comb filter.

9. An image signal correction circuit according to claim 1, wherein the first interframe processor includes a frame comb filter.

10. An image signal processing circuit comprising:
signal discriminating means including;
a standard/non-standard signal determining circuit for determining whether an input image signal is a standard signal conforming to the predetermined standards of an image signal or a non-standard signal not conforming to the standards, a first intrafield processor for receiving the image signal and separating Y and C signals in the same field, first switching means for selecting the image signal in accordance with a standard output of the standard/non-standard signal determining circuit and outputting a luminance signal of the outputs of the first intrafield processor in accordance with a non-standard output, second switching means for selecting the image signal in accordance with the standard output of the standard/non-standard signal determining circuit and outputting a color difference signal of the outputs of the first intrafield processor in accordance with the non-standard output, and a synchronizing signal generator for selecting one of a clock signal phase-locked to a color burst signal of the image signal and a clock signal phase-locked to the horizontal synchronizing signal and outputting the selected signal;

luminance signal separating means including;

a first delay circuit for receiving the signal from the first switching means and delaying this signal by about twice its vertical scanning period, a first interframe processor for using the input and output signals of the first delay circuit to generate an interframe processed signal, a second intrafield processor for processing the delayed image signal from the first delay circuit in the same field, a motion detector for detecting a motion of the image contained in the received image signal, and a first mixer for mixing the output signal of the first; intraframe processor and the output signal of the second intrafield processor in accordance with a signal indicative of the magnitude of motion of the image detected by the motion detector, luminance signal scanning line interpolating means including;

second delay circuit for delaying the output signal of the first mixer by about a vertical scanning period, a third intrafield processor for processing the output signal of the first mixer in the same field of the output signal of the first mixer, a second mixer for mixing the output signal of the second delay circuit and the output signal of the third intrafield processor in accordance with the magnitude of motion of the image detected by the motion detector, and a first synthesizing means for synthesizing the output signals of the first and second mixers, color demodulating means including;

a filter for receiving the signal from the second switching means and outputting a color band signal, a color demodulating circuit for receiving the output signal of the filter and outputting two kinds of baseband color difference signals, and a multiplexer for multiplexing the two kinds of baseband color difference signals and outputting the result, color difference signal separating means including;

a third delay circuit for receiving the output signal of the color demodulating means and delaying the output signal by about twice the vertical scanning period of the output signal, a second interframe processor for using the input and output signals of the third delay circuit to generate an interframe processed signal for the input and output signals, a fourth intrafield processor for processing the delayed image signal from the third delay circuit in the same field signal, a motion detector means for detecting a magnitude of motion of an image contained in the received image signal, a third mixer for mixing the output signal of the second interframe processor and the output signal of the fourth intrafield processor in accordance with the magnitude of motion of the picture detected by the motion detector means, and color difference signal scanning line interpolating means including;

a fifth intrafield processor for processing the output of the third mixer in the same field, a first separator for separating the output of the third mixer into two color difference signals, a second separator for separating the output of the fifth intrafield processor into two color difference signals, and second and third synthesizing means for receiving the outputs of the first and second separators one by one and synthesizing these signals.

11. An image signal correction circuit according to claim 10, further comprising:

signal outputting means for receiving the output signal of the luminance signal scanning line interpolating means and the output signal of the color difference signal scanning line interpolating means, performing a matrix operation on these signals, and generating and outputting R, G and B signals.

12. An image signal correction circuit according to claim 10, wherein the first delay circuit of the luminance signal separating means comprises two serially connected vertical scanning period delay circuits, the second intrafield processor comprises a circuit to process in the same field the image signal delayed by one vertical scanning period in one of the vertical scanning period delay circuits constituting the first delay circuit, the third delay circuit of the color difference signal separating means includes two serially connected vertical scanning period delay circuits, and the fourth intrafield processor includes a circuit to process in the same field the image signal delayed by one vertical scanning period in one of the vertical scanning period delay circuits constituting the third delay circuit.

13. An image signal correction circuit according to claim 10, wherein the first delay circuit of the luminance signal separating means includes two parallel connected vertical scanning period delay circuits, the luminance signal separating means including first and second selectors connected to the inputs of the second intrafield processor and the first interframe processor switched in accordance with the output of the synchronizing generator for each field so as to receive separate delay signals alternately from both the vertical scanning period delay circuits, the third delay circuit of the color difference signal separating means includes two parallel connected vertical scanning period delay circuits, and color difference signal separating means including third and fourth selectors connected to the inputs of the fourth intrafield processor and the second interframe processor and switched for each field in accordance with the output signal from the synchronizing generator so as to receive separate delay signals alternately from both the vertical scanning period delay circuits.

14. An image signal circuit according to claim 10, wherein the luminance signal separating means includes a first selector provided at the output of the second intrafield processor, the first selector selecting one of the input and output signals of the second intrafield processor in accordance with the output signal of the standard/non-standard signal determining circuit and outputting the selected signal to the first mixer, and wherein the color difference signal separating means includes a second selector provided at the output of the fourth intrafield processor, the second selector selecting one of the input and output signals of the fourth intrafield processor in accordance with the output signal of the standard/non-standard signal determining circuit and outputting the selected signal to the third mixer.

15. An image signal correction circuit according to claim 10, wherein the luminance signal separating means includes a first selector provided before the second intrafield processor for selecting one of the input and output signals of the first delay circuit in accordance with a predetermined external signal and outputting the selected signal to the second intrafield processor, the color difference signal separating means includes a second selector before the fourth intrafield processor for selecting one of the input and output signals of the third delay circuit in accordance with a predetermined external signal to output the selected signal to the fourth intrafield processor.

16. An image signal correction circuit according to claim 10, wherein the luminance signal separating means includes a low-pass filter for receiving the output signal of the first delay circuit, an edge detector and a selector for selecting one of the output signal of the second intrafield processor and the output signal of the low-pass filter in accordance with the output signal of the edge detector to output the selected signal to the first mixer.

17. An image signal correction circuit according to claim 14, wherein the luminance signal separator includes a third selector provided before the second intrafield processor for selecting one of the input and output signals of the first delay circuit in accordance with a predetermined external signal and outputting the selected signal to the second intrafield processor, the color difference signal separating means includes a fourth selector before the fourth intrafield processor for selecting one of the input and output signals of the third delay circuit in accordance with a predetermined external signal to output the selected signal to the fourth intrafield processor.

18. An image signal correction circuit according to claim 17, wherein the luminance signal separating means further includes a low-pass filter for receiving the output signal of the third selector, an edge detector and a seventh selector for selecting one of the output of the first selector and the output of the low-pass filter in accordance with the output signal of the edge detector to output the selected signal to the first mixer.

19. An image signal correction circuit according to claim 10, wherein the first delay circuit includes a frame memory.

20. An image signal correction circuit according to claim 10, wherein the second intrafield processor includes a line comb filter.

21. An image signal correction circuit according to claim 10, wherein the first interframe processor includes a frame comb filter.

22. An image signal correction circuit according to claim 10, wherein the standard/non-standard signal determining circuit determines whether the input signal is of an NTSC standard.

* * * * *